(12) United States Patent
Arai

(10) Patent No.: US 8,023,368 B2
(45) Date of Patent: Sep. 20, 2011

(54) TILT SENSOR AND OPTICAL DISK DRIVE

(75) Inventor: Akihiro Arai, Kyoto (JP)

(73) Assignee: Panasonic Corporation, Osaka (JP)

( * ) Notice: Subject to any disclaimer, the term of this patent is extended or adjusted under 35 U.S.C. 154(b) by 1057 days.

(21) Appl. No.: 10/963,851

(22) Filed: Oct. 13, 2004

(65) Prior Publication Data

US 2005/0083816 A1    Apr. 21, 2005

(30) Foreign Application Priority Data

Oct. 16, 2003    (JP) .................................. 2003-356074

(51) Int. Cl.
*G11B 7/095* (2006.01)
*G11B 7/135* (2006.01)

(52) U.S. Cl. ................ 369/44.24; 369/112.06; 369/118; 369/53.19; 369/53.28; 369/47.17; 369/112.01

(58) Field of Classification Search ............... 369/44.24, 369/44.23, 53.19, 110, 112, 13, 103, 109, 369/53.28, 44.37, 44.41, 44.42, 47.17
See application file for complete search history.

(56) References Cited

U.S. PATENT DOCUMENTS

| | | | | |
|---|---|---|---|---|
| 4,694,443 | A | * | 9/1987 | Ando ........................ 369/44.24 |
| 5,978,332 | A | * | 11/1999 | Itakura et al. ............... 369/44.32 |
| 6,122,241 | A | * | 9/2000 | Akiyama et al. ......... 369/112.12 |
| 6,275,463 | B1 | | 8/2001 | Nagata et al. |
| 2001/0046195 | A1 | | 11/2001 | Togashi |
| 2002/0048243 | A1 | | 4/2002 | Yanagisawa et al. |
| 2002/0080693 | A1 | | 6/2002 | Ma et al. |
| 2002/0101813 | A1 | * | 8/2002 | Dang et al. ............... 369/112.28 |
| 2003/0112722 | A1 | * | 6/2003 | Matsuura ................... 369/44.32 |
| 2004/0062158 | A1 | * | 4/2004 | Arai et al. .................. 369/44.32 |

FOREIGN PATENT DOCUMENTS

| | | |
|---|---|---|
| EP | 1085509 A2 | 3/2001 |
| EP | 1575038 A1 | 9/2005 |
| JP | 2003-045058 A | 2/2003 |
| JP | 2004-071010 A | 3/2004 |

OTHER PUBLICATIONS

European Search Report for the corresponding European Patent Application No. 04024402.2; Mailed Jul. 25, 2008; 3 pages.

(Continued)

*Primary Examiner* — Wayne Young
*Assistant Examiner* — Dionne Pendleton
(74) *Attorney, Agent, or Firm* — Panitch Schwarze Belisario & Nadel LLP

(57) ABSTRACT

A tilt sensor includes a photodetector having a photosensitive plane and detecting a light beam in multiple areas and outputting detection signals representing its intensities and a tilt detector for generating a tilt error signal, including information about the tilt of a disk, based on the detection signals. The light beam forms a beam spot on the photosensitive plane. The beam spot includes a +first-order light area in which zero-order and +first-order light rays, diffracted by a track on the disk, are superposed, −first-order light area in which zero-order and −first-order light rays are superposed, and a zero-order light area which is sandwiched between the +first-order and −first-order light areas, includes neither the +first-order nor −first-order light ray, but includes a zero-order light ray. The photodetector generates the detection signals except for light entering an opaque area provided for at least part of the zero-order light area.

24 Claims, 13 Drawing Sheets

OTHER PUBLICATIONS

Japanese Notice of Reason for Rejection issued on Oct. 20, 2009 for Japanese counterpart Patent Application No. 2004-295748 (with English Translation).

Summons to attend oral proceedings for EP Application No. 04024402.2, mailing date: May 18, 2011 (7 pages).

* cited by examiner

TRACK DIRECTION

TILT SENSOR AND OPTICAL DISK DRIVE

BACKGROUND OF THE INVENTION

1. Field of the Invention

The present invention relates to an optical disk drive for optically reading and/or writing data from/on a data storage medium such as an optical disk and more particularly relates to a technique of sensing the tilt of an optical disk.

2. Description of the Related Art

The storage densities of optical disks are further increasing these days. To catch up with this trend, the beam spot of a light beam for reading and/or writing data from/on such a high-density disk needs to have a further decreased size. For that purpose, an objective lens with a large numerical aperture (NA) is used more and more often. However, if the optical disk has a significant tilt due to warp, an influence of a coma aberration will become too large to ignore and the optical disk drive cannot properly perform read and write operations. To avoid such aberrations, the optical disk drive needs to be provided with a mechanism for sensing the tilt angle of the data storage layer of the optical disk with respect to the optical axis of the objective lens and correcting that tilt angle such that the optical axis of the objective lens crosses the data storage layer of the optical disk at right angles.

FIG. 15 schematically shows a configuration for a conventional optical disk drive as disclosed in Japanese Laid-Open Publication No. 2003-45058.

As shown in FIG. 15, the conventional optical disk drive includes a light source 101, a beam splitter 103, an objective lens 104, a detection optical system 106, a photodetector 107, and a tilt detector 108. The tilt detector 108 includes a signal calculator 109, an amplifier 110 and a differential amplifier 111.

The light emitted from the light source 101 and having an optical axis 102 is transmitted through the beam splitter 103 and then focused by the objective lens 104 onto the data storage layer of a given optical disk 105. Next, the light is reflected from the optical disk 105, transmitted through the objective lens 104 and then reflected by the beam splitter 103 toward the detection optical system 106. Thereafter, the light is transmitted through the detection optical system 106 and then incident onto the photodetector 107.

FIG. 16 schematically illustrates the photosensitive areas of the photodetector 107 and the cross section (i.e., beam spot 112) of the incident light beam. The photodetector 107 includes photosensitive areas 107a through 107f, which are irradiated with the light beam that has been reflected from the optical disk 105. The beam spot 112 of the light beam has an area 112a including only the zero-order component of the light that has been diffracted by a track groove of the optical disk 105, an area 112b in which the zero-order and +first-order components thereof are superposed one upon the other, and an area 112c in which the zero-order and −first-order components thereof are superposed one upon the other.

As shown in FIG. 16, the light beam with the beam spot 112 is detected by the six photosensitive areas 107a through 107f separately. The signals obtained from the photosensitive areas 107a through 107f are input to the signal calculator 109, which calculates differential signals PP1 and PP2 by the following equations:

$$PP1 = 107a + 107b - (107c + 107d)$$

$$PP2 = 107e - 107f$$

where the reference numerals 107a through 107f represent the signals obtained from the respective photosensitive areas 107a through 107f.

In the tilt detector 108, the amplifier 110 multiplies the signal PP1 by k. The differential amplifier 111 calculates the difference between the signal PP1 that has been multiplied by k and the signal PP2 and outputs the difference as a tilt error signal TILT. That is to say, the tilt error signal TILT is given by:

$$TILT = PP2 - k*PP1$$

where * is an operator of multiplication. The constant k is determined so as to correct the offset of the signal PP2, which is caused by the shift of the optical axis of the objective lens 104 from the optical axis 102 of the optical system, by the signal PP1. Thus, the tilt error signal TILT is a signal obtained by correcting the offset that has been caused by the shift of the optical axis of the objective lens 104.

If the optical disk 105 has tilted in its radial direction with respect to the optical axis 102 of the optical system, the coma aberration, produced while the light is passing through the transparent substrate of the optical disk, mainly deforms the wavefronts of parts of the light beam corresponding to the areas 112b and 112c in which the zero-order and ±first-order components of the light diffracted by the tracks are superposed one upon the other. The wavefronts are deformed differently in the respective photosensitive areas 107a through 107f. Accordingly, the signals PP1 and PP2 are subject to different types of modulation. The difference in modulation is affected by the tilt of the disk and expresses itself in the tilt error signal TILT. Thus, by detecting the tilt error signal TILT while the beam spot is following the track, the tilt of the optical disk can be detected without being affected by the shift of the objective lens so easily.

However, the present inventors discovered that when the tilt of an optical disk, on which a recorded track and an unrecorded track had different reflectances, was detected by the technique disclosed in Japanese Laid-Open Publication No. 2003-45058, the optical disk tilt detection signal was easily affected by how much the light beam was out of focus with the optical disk (which will also be referred to herein as "the degree of defocusing") in a boundary between the recorded and unrecorded tracks. This problem will be described in further detail below.

FIG. 17A is a schematic cross-sectional view of tracks provided on the data storage layer of an optical disk. Among the three tracks illustrated in FIG. 17A, information has already been written on only the hatched track on the left-hand side. The recorded track has a lower reflectance than the other unrecorded tracks. FIG. 17B shows the waveforms of a tilt error signal TILT, which were obtained by simulating a situation where a beam spot was crossing the tracks arranged as shown in FIG. 17A, i.e., such that every third track was recorded. The following is the conditions for the simulations:
(Condition 1)
Waveform of light source: 405 nm;
NA of objective lens: 0.85;
Thickness of transparent substrate of optical disk: 100 μm
Track pitch: 0.32 μm;
Track groove width: 0.18 μm;
Track depth: 1/12 wavelength;
Reflectance of recorded track: 0.5;
Reflectance of unrecorded track: 1; and
Tilt of optical disk: NO.

Also, the ratio of the width of the photosensitive areas 107e and 10f for detecting the signal PP2 as measured in the track direction to the beam spot diameter was supposed to be 0.35, and the constant k was supposed to be 0.75, which is defined to correct the offset caused by the shift of the optical axis of the objective lens as described above.

In FIG. 17B, the abscissa represents the location of the beam spot as measured in the radial direction of the optical disk with respect to the center of the central track shown in FIG. 17A as the origin. More specifically, the respective centers of the three tracks shown in FIG. 17A were located at 0 μm and ±0.32 μm as shown in FIG. 17B. Also, in FIG. 17B, the three curves represent the waveform of the tilt error signal TILT in a situation where the light beam was exactly focused on these tracks (i.e., with no defocusing, DF=0 μm), and the waveforms of the tilt error signals TILT in situations where the focal point deviated by ±0.2 μm (i.e., DF=±0.2 μm). As shown in FIG. 17B, the respective levels of the tilt error signals TILT were the same at the beam spot location of −0.32 μm no matter whether the light beam was in focus or not, while those signal levels changed according to the focusing state at the origin and at the beam spot location of +0.32 μm. The results shown in FIG. 17B were obtained by simulating the situation where the disk had no tilt. However, the level of the tilt error signal TILT still changed according to the focusing state. For that reason, the conventional tilt error signal TILT to be detected while the beam spot is following the center or right-hand-side one of the three tracks shown in FIG. 17A changes its level according to the degree of defocusing, thus creating an error as if the tilt of the optical disk were measured.

SUMMARY OF THE INVENTION

In order to overcome the problems described above, preferred embodiments of the present invention provide a tilt sensor, which can detect the tilt of a given optical disk accurately even at a boundary between two adjacent tracks, where the reflectance changes, and irrespective of the focusing state of the light beam being converged toward the optical disk, and also provide an optical disk drive including such a tilt sensor.

A tilt sensor according to a preferred embodiment of the present invention may be used to detect the tilt of a given optical disk by getting a light beam, emitted from a light source, converged by an objective lens toward a data storage layer of the optical disk and by sensing the intensities of the light beam, consisting of multiple light rays diffracted by at least one track on the data storage layer. The tilt sensor preferably includes: a photodetector having a photosensitive plane and detecting the light beam in a plurality of areas and outputting a plurality of detection signals representing the intensities of the light beam detected in the respective areas; and a tilt detector for generating a tilt error signal, including information about the tilt of the optical disk, based on the detection signals. The light beam preferably forms a beam spot on the photosensitive plane. The beam spot preferably includes a +first-order light area, in which zero-order and +first-order light rays, diffracted by the track, are superposed one upon the other, −first-order light area, in which the zero-order light ray and a −first-order light ray are superposed one upon the other, and a zero-order light area, which is sandwiched between the +first-order and −first-order light areas, includes neither the +first-order light ray nor the −first-order light ray, but includes a zero-order light ray. The photodetector preferably generates the detection signals except for light rays that have entered an opaque area, which is provided for at least part of the zero-order light area.

In one preferred embodiment of the present invention, the photosensitive plane includes a first-division area and a pair of second-division areas that sandwiches the first-division area between themselves. The first-division area is preferably provided so as to receive parts of the light beam corresponding to respective central portions of the +first-order and −first-order light areas. Each of the first-division and second-division areas is preferably split into two areas to detect parts of the light beam corresponding to the +first-order light area and the −first-order light area, respectively.

In another preferred embodiment of the present invention, the photosensitive plane is split into a pair of sub-regions by a division line that crosses the +first-order and −first-order light areas so as to divide the beam spot of the light beam symmetrically into two, one of the pair of sub-regions including a first-division area which receive parts of the light beam corresponding to respective central portions of the +first-order and −first-order light areas and a remaining second-division area other than the first-division area. Each of the first-division and second-division areas is split into two areas to detect the light beam corresponding to the +first-order light area and the −first-order light area, respectively.

In these particular preferred embodiments, the tilt detector preferably generates two push-pull signals for the first- and second-division areas of the photodetector and preferably senses a phase difference between a waveform modulated by a track associated with one of the two push-pull signals and another waveform modulated by the same track associated with the other push-pull signal.

More specifically, the tilt detector preferably senses the phase difference by detecting and comparing the levels of the two push-pull signals while the light beam focused by the objective lens is following the track.

Alternatively, the tilt detector may multiply one of the two push-pull signals by a predetermined coefficient, generate a differential signal representing a difference between the multiplied and non-multiplied push-pull signals, and detect the level of the differential signal while the light beam focused by the objective lens is following the track.

In still another preferred embodiment, the photosensitive plane includes a first-division area, a pair of second-division areas that sandwiches the first-division area between themselves, and a pair of third-division areas that sandwiches the first- and second-division areas between themselves. The first-division area is preferably provided so as to receive parts of the light beam corresponding to respective central portions of the +first-order and −first-order light areas. The second-division areas are preferably provided so as to receive other parts of the light beam corresponding to other portions of the +first-order and −first-order light areas. The third-division areas are preferably provided so as to receive only parts of the light beam corresponding to portions of the zero-order light area. Each of the first-, second- and third-division areas is preferably split into two areas by a division line between the +first-order and −first-order light areas in the beam spot of the light beam to detect the light beam in the two split areas.

In still another preferred embodiment, the photosensitive plane is split into a pair of sub-regions by a division line that crosses the +first-order and −first-order light areas so as to divide the beam spot of the light beam symmetrically into two, one of the pair of sub-regions including a first-division area which receives parts of the light beam corresponding to respective central portions of the +first-order and −first-order light areas, second-division area which is adjacent to the first-division area and receives parts of the light beam corresponding to remaining portions of the +first-order and −first-order light areas and a third-division area which is adjacent to the second-division area and receives the light beam corresponding to the zero-order light area. Each of the first-, second- and third-division areas is split into two areas by a division line between the +first-order and −first-order light areas in the beam spot of the light beam to detect the light beam in the two split areas.

In these particular preferred embodiments, the tilt detector preferably generates three push-pull signals for the first-, second- and third-division areas of the photodetector, multiplies the push-pull signal associated with either the first-division area or third-division areas by a first predetermined value, and generates a first differential signal representing a difference between the multiplied and non-multiplied push-pull signals. The tilt detector preferably also multiplies the push-pull signal associated with either the second- or third-division areas by a second predetermined value, generates a second differential signal representing a difference between the multiplied and non-multiplied push-pull signals, and senses a phase difference between a waveform modulated by a track associated with the first differential signal and another waveform modulated by the same track associated with the second differential signal.

In still another preferred embodiment, the tilt detector preferably senses the phase difference by detecting and comparing the levels of the first and second differential signals while the light beam focused by the objective lens is following the track.

In yet another preferred embodiment, the opaque area preferably cuts off only a part of the light beam that is going to enter the first- and second-division areas.

In yet another preferred embodiment, a recorded track and an unrecorded track of the optical disk preferably have different reflectances.

In yet another preferred embodiment, the opaque area is preferably provided symmetrically with respect to at least a centerline splitting the first-division area into two.

In yet another preferred embodiment, the photodetector preferably includes a photosensor having the photosensitive plane to be irradiated with the light beam. The first- and second-division areas are preferably defined on the photosensitive plane.

In this particular preferred embodiment, the photosensor preferably includes an opaque film on the photosensitive plane so as not to detect the light beam in the opaque area.

Alternatively, the photosensor may include a detection area for detecting the light beam in an area corresponding to the opaque area, and a signal obtained from the detection area is preferably not used by the tilt detector to generate the tilt error signal.

In yet another preferred embodiment, the photodetector preferably includes a hologram, which has the photosensitive plane to be irradiated with the light beam and which is provided with the first- and second-division areas, and a photosensor for detecting light rays that have come from the first- and second-division areas of the hologram.

In that case, the hologram diffracts a part of the light beam in the opaque area so that the photosensor does not receive the part of the light beam.

In yet another preferred embodiment, the photodetector preferably includes a photosensor having the photosensitive plane to be irradiated with the light beam. The first-, second- and third-division areas are preferably defined on the photosensitive plane.

In this particular preferred embodiment, the photosensor preferably includes an opaque film on the photosensitive plane so as not to detect the light beam in the opaque area.

Alternatively, the photosensor may include a detection area for detecting the light beam in an area corresponding to the opaque area, and a signal obtained from the detection area is preferably not used by the tilt detector to generate the tilt error signal.

In yet another preferred embodiment, the photodetector preferably includes a hologram, which has the photosensitive plane to be irradiated with the light beam and which is provided with the first-, second- and third-division areas, and a photosensor for detecting light rays that have come from the first-, second- and third-division areas of the hologram.

In that case, the hologram diffracts a part of the light beam in the opaque area so that the photosensor does not receive the part of the light beam.

An optical disk drive according to a preferred embodiment of the present invention preferably includes: a disk motor for rotating and driving an optical disk with a data storage layer; an optical head, which includes a light source, an objective lens for focusing a light beam, emitted from the light source, onto the data storage layer of the optical disk, and a tilt compensator for compensating an aberration due to a tilt of the objective lens with respect to a direction perpendicular to the data storage layer and which reads and writes data from/on the data storage layer; the tilt sensor according to any one of the preferred; and a drive signal generator for driving the objective lens driver on receiving the tilt error signal from the tilt sensor.

In one preferred embodiment, the tilt compensator is an objective lens driver for tilting the objective lens at least in a radial direction of the optical disk.

According to various preferred embodiments of the present invention described above, the unwanted effects of the asymmetric light intensity distribution in the zero-order light area, resulting from the difference in reflectance between two adjacent tracks, can be minimized, thus generating a tilt error signal highly accurately, irrespective of the focusing state of the light beam being converged toward the optical disk. Accordingly, even if the optical disk is warped, for example, data can still be read and written at a high density from/on the optical disk.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 14:
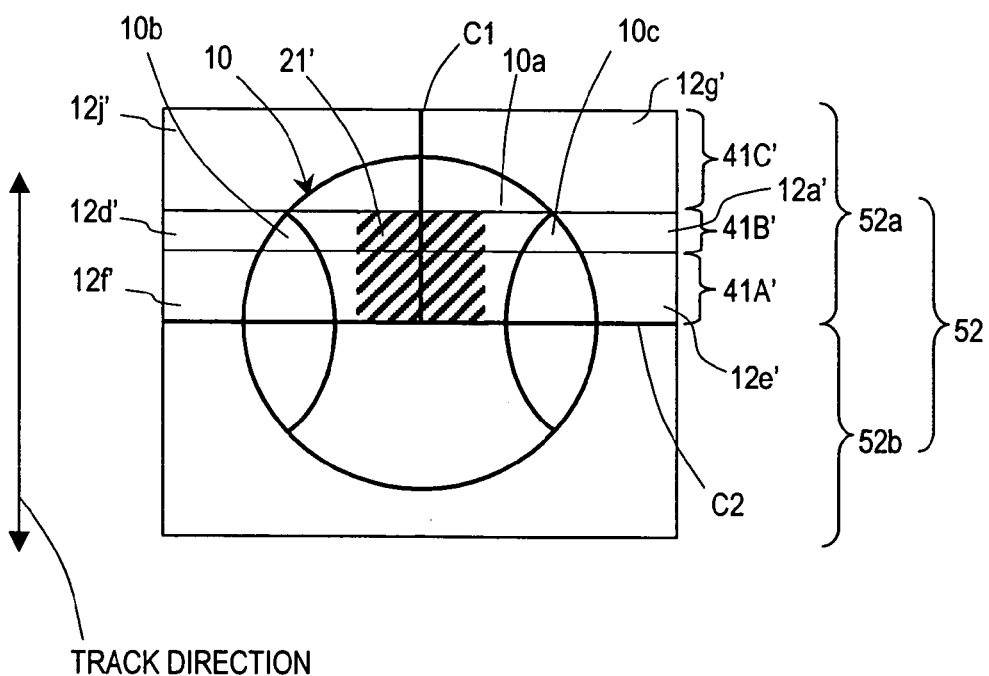
FIG. 14 is a modified example of the second specific preferred embodiment in which the upper half area of the light beam is used to produce the tilt error signal.
Figure 15:
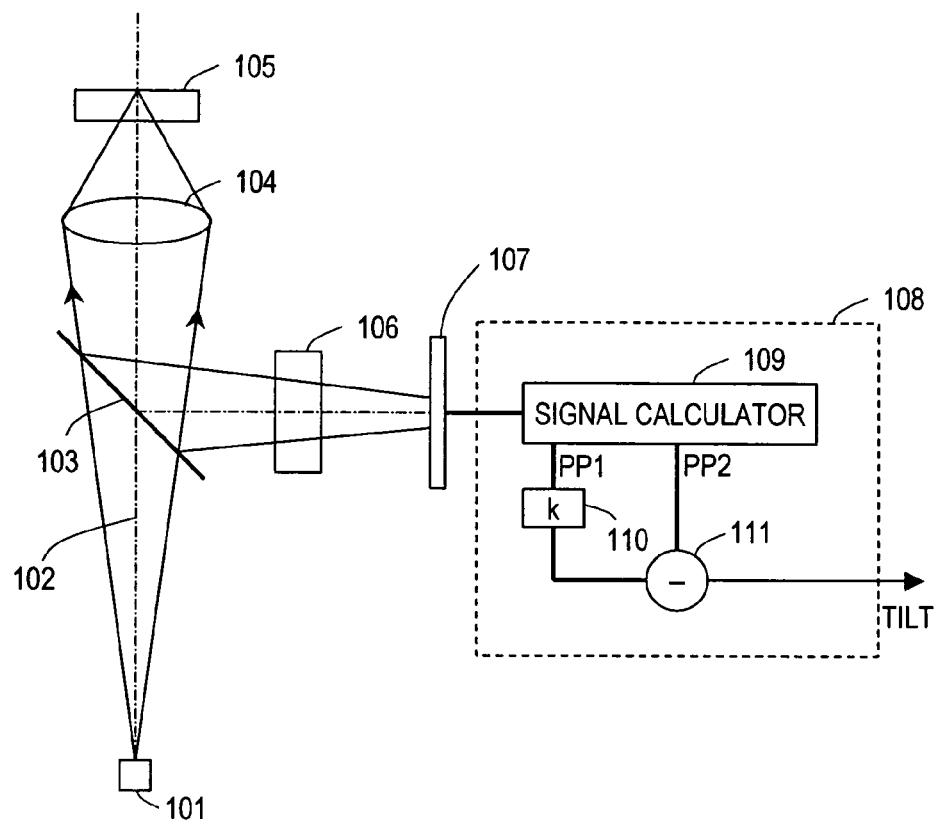
FIG. 15 is a block diagram showing a configuration for a conventional optical disk drive.
Figure 16:
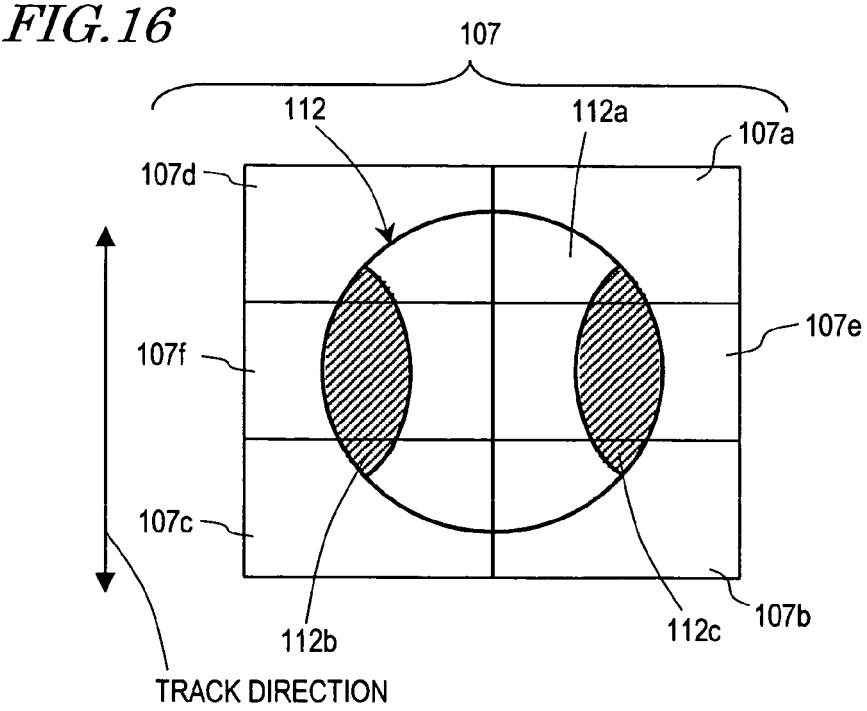
FIG. 16 is a plan view illustrating the photosensitive plane of the conventional optical disk drive.
Figure 17A:
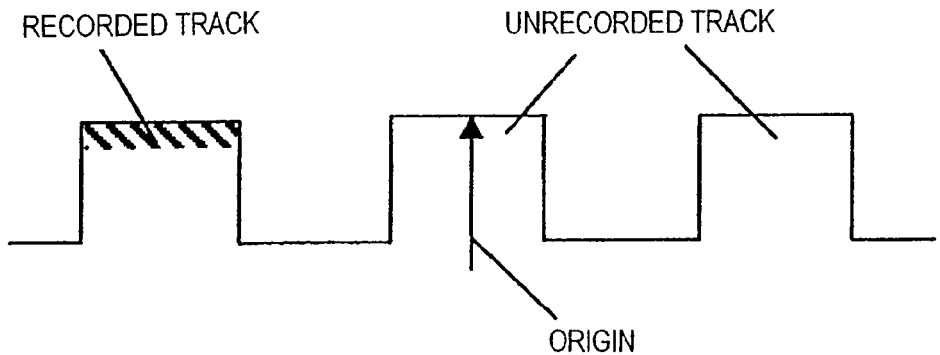
FIG. 17A schematically illustrates the structure of an optical disk.

The present inventors carried out an extensive research to find out the reason why the optical disk tilt error signal depended on the focusing state of the light beam being converged on the optical disk at a boundary between two adjacent tracks where the reflectance changed. As a result, the present inventors discovered that if a recorded track and an unrecorded track were adjacent to a center track as shown in FIG. 17A, the light beam incident on the optical disk produced not only light diffracted by the respective tracks but also additional diffracted light by a structure in which a reflectance changed in a period that was three times as long as the track pitch. We also discovered that this additional diffracted light produced some asymmetric light intensity distribution in the area 112a, including only the zero-order light component of the light beam reflected from the optical disk as shown in FIG. 14, and changed its distribution according to the focusing state of the light beam being converged toward the optical disk. The present inventors believe that this be the reason why the tilt error signal changed according to the focusing state of the light beam being converged toward the optical disk, thus creating an erroneous tilt signal.

Figure 1A:
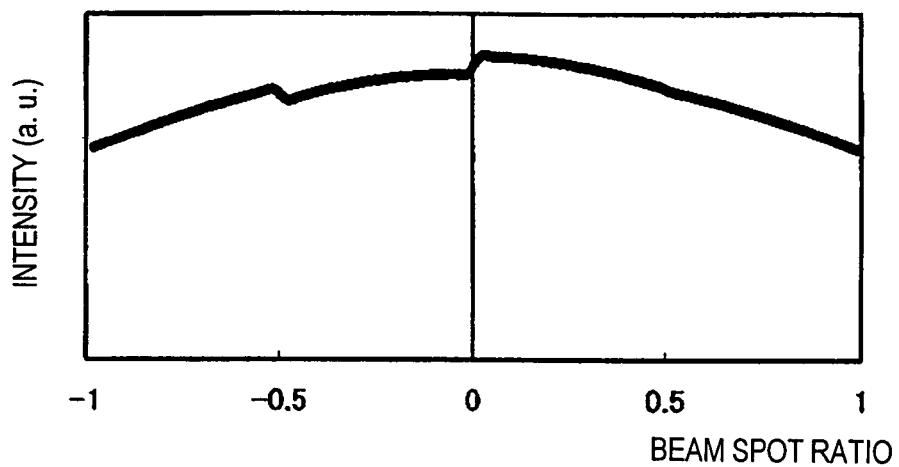
FIG. 1A is a graph showing the intensity distribution of a light beam that has been reflected from an optical disk in a situation where the light beam is in focus with a target track and where two adjacent tracks thereof have different reflectances.
Figure 1B:
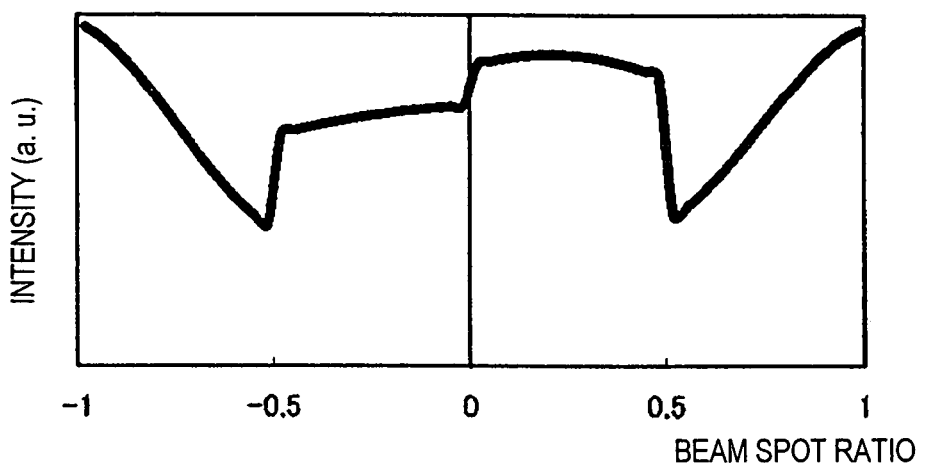
FIG. 1B is a graph showing the intensity distribution of a light beam that has been reflected from an optical disk in a situation where the light beam is out of focus with a target track and where two adjacent tracks thereof have different reflectances.
Figure 1C:
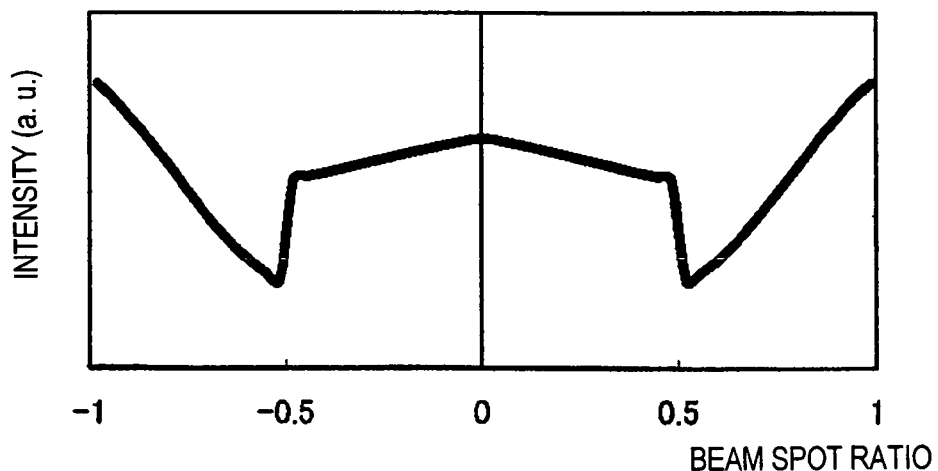
FIG. 1C is a graph showing the intensity distribution of a light beam that has been reflected from an optical disk in a situation where the light beam is out of focus with a target track and where two adjacent tracks thereof have the same reflectance.

FIGS. 1A through 1C are graphs showing the intensity distributions of the light beam reflected from an optical disk. Each of these intensity distributions represents a cross section of the light beam, which passes the center (i.e., the optical axis) of the light beam and which is taken perpendicularly to the tracks (i.e., in the radial direction of the optical disk). The intensity distributions shown in FIGS. 1A through IC were calculated under the conditions specified for the background section of this description. FIG. 1A shows an intensity distribution in a situation where the light beam is incident on the center of the center track shown in FIG. 17A and in focus with the data storage layer. FIG. 1B shows an intensity distribution in a situation where the light beam is incident on the center of the center track shown in FIG. 17A but defocused from the data storage layer by 0.2 μm. And FIG. 1C shows an intensity distribution in a situation where the light beam is incident on the center of the left-hand-side track shown in FIG. 17A but defocused from the data storage layer by 0.2 μm. In each of the graphs shown in FIGS. 1A through 1C, the abscissa represents the beam spot ratio calculated with respect to the radius of the beam spot as unity, while the ordinate represents the intensity of the light. The internal range specified by the abscissas of ±0.5 roughly corresponds to the area including only the zero-order components of the diffracted light, while the other external ranges correspond to the areas in which the zero- and first-order components of the diffracted light are superposed on upon the other. As can be seen from FIG. 1A, since the two tracks adjacent to the center track on the right- and left-hand sides have mutually different reflectances, the reflectance distribution becomes asymmetric with respect to the track on which the light beam is being incident. For that reason, even if the light beam is in focus, the light intensity distribution becomes asymmetric as shown in FIG. 1A. The degree of asymmetry in light intensity distribution naturally increases if the light beam is out of focus as shown in FIG. 1B. Furthermore, as shown in FIG. 1C, if the two tracks adjacent to the center track on the right- and left-hand sides have the same reflectance, the light intensity distribution becomes symmetric even when the light beam is out of focus. As can be seen, in the area including nothing but the zero-order components, the degree of symmetry of the intensity distribution changes according to the beam spot location or the focusing state of the light beam. This should be the reason why in a situation where two adjacent tracks have different reflectances, the light intensity becomes asymmetric due to an interference between the diffracted light produced by the structure in which the reflectance changes in a period that is three times as long as the track pitch and the zero-order component and the interference state also varies with the focusing state of the light beam.

On the other hand, as can be seen from FIGS. 1A through 1C, in the areas where the zero- and first-order components are superposed one upon the other, the light intensity distribution is approximately symmetric irrespective of the beam spot location or focusing state of the light beam. That is to say, the intensity of the light falling on those areas where the zero- and first-order components are superposed one upon the other is not likely changeable with the beam spot location or focusing state of the light beam even in the optical disk on which the recorded and unrecorded tracks have different reflectances.

In view of these considerations, in detecting the tilt of an optical disk on which the recorded and unrecorded tracks have different reflectances, portion of the light beam, which has been reflected from the optical disk and then incident on the zero-order component area, is not used to generate a tilt error signal. Then, it is possible to reduce the effects of the focusing state on the tilt error signal.

Hereinafter, preferred embodiments of the present invention will be described with reference to the accompanying drawings.

Embodiment 1

Figure 2:
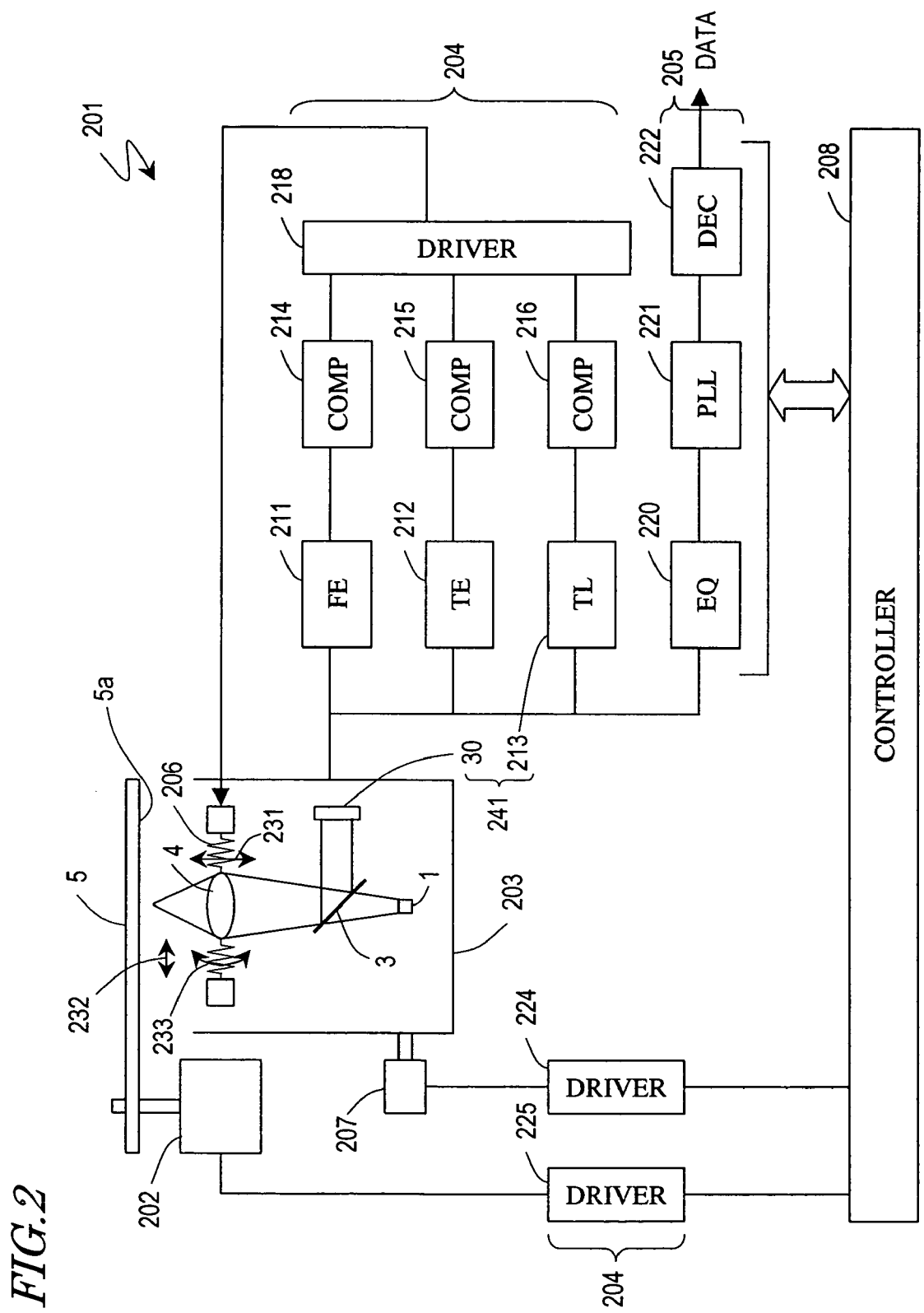
FIG. 2 is a block diagram showing a configuration for an optical disk drive according to a first specific preferred embodiment of the present invention.

FIG. 2 is a block diagram showing a configuration for an optical disk drive according to a first specific preferred embodiment of the present invention. The optical disk drive of this preferred embodiment is supposed to be a read-only drive. However, the present invention is also applicable for use in a write-only drive and a read/write drive. As shown in FIG. 2, the optical disk drive 201 preferably includes a disk motor 202, an optical head 203, a control system 204, a read signal processing system 205 and a controller 208.

The disk motor 202 preferably includes a spindle motor with a turntable to mount an optical disk 5 thereon and preferably spins and drives the optical disk 5 on the turntable.

The optical head 203 preferably focuses light on the data storage layer 5a of the optical disk 5, thereby reading and/or writing data from/on the data storage layer 5a by means of the focused light. The optical head 203 preferably includes a light source 1 for emitting the light for read and/or write operations, a beam splitter 3, an objective lens 4 and an objective lens driver 206.

The light emitted from the light source 1 is transmitted through the beam splitter 3 and then focused by the objective lens 4 onto the data storage layer 5a of the optical disk 5 by way of its transparent substrate. Next, the light is reflected from the data storage layer 5a, transmitted through the objective lens 4 again, and then reflected by the beam splitter 3 toward the photodetector 30 to be described in detail later.

The objective lens driver 206 is preferably connected to the objective lens 4. The objective lens driver 206 functions as a focus compensator and a tracking compensator, so as to drive the objective lens 4 perpendicularly to, and parallel to, the data storage layer 5a of the optical disk 5 as pointed by the arrows 231 and 232, respectively. The arrows 231 and 232 may be referred to as a focus direction and a tracking direction, respectively. Also, the objective lens driver 206 further functions as a tilt compensator to rotate the objective lens 4 in the tilt direction 233 in order to change the tilt angle of the optical disk 5 in the radial direction thereof. A traverse driver 207 is preferably connected to the optical head 203 to move the optical head 203 in its entirety in the radial direction of the optical disk 5. A known drive mechanism for driving the objective lens of an optical disk drive may be adopted as the objective lens driver 206. For example, a structure for driving or displacing an objective lens with electromagnetic force produced by a coil and a magnet may be adopted.

The control system 204 preferably controls the rotation of the optical disk 5 and the focusing state and beam spot location of the light to be focused on the data storage layer 5a of the optical disk 5. More specifically, the control system 204 preferably controls the disk motor 202, traverse driver 207 and objective lens driver 206. For that purpose, the control system 204 preferably includes the photodetector 30, a focus error signal generator 211, a tracking error signal generator 212, a tilt detector 213, phase compensators 214, 215 and 216 and a drive signal generator 218. The photodetector 30 preferably receives the light beam reflected from the data storage layer 5a and detects its intensities in a plurality of photosensitive areas, thereby generating a plurality of detection signals representing the respective intensities.

The focus error signal generator 211 receives those detection signals from the photodetector 30, thereby generating a focus error signal representing how much the focusing state of the light beam converged on the data storage layer 5a has deviated from a predetermined state. The phase compensator 214 compensates for the phase of the focus error signal and then outputs it as a focus control signal to the drive signal generator 218. On receiving the focus control signal, the drive signal generator 218 outputs a focus drive signal to the objective lens driver 206 to drive the objective lens 4 perpendicularly to the data storage layer 5a as pointed by the arrow 231. As a result, the light focused on the data storage layer 5a is controlled so as to maintain a predetermined focusing state.

The tracking error signal generator 212 also receives the detection signals from the photodetector 30, thereby generating a tracking error signal representing how much the light beam focused on the data storage layer 5a has deviated from its target track. The phase compensator 215 compensates for the phase of the tracking error signal and then outputs it as a tracking control signal to the drive signal generator 218. On receiving the tracking control signal, the drive signal generator 218 outputs a tracking drive signal to the objective lens driver 206 to drive the objective lens 4 parallel to the data storage layer 5a as pointed by the arrow 232. As a result, the light focused on the data storage layer 5a is controlled so as to always follow the predetermined tracks.

As will be described in detail later, the photodetector 30 and the tilt detector 213 together make up a tilt sensor 241. The tilt detector 213 also receives the detection signals from the photodetector 30, thereby generating a tilt error signal representing how much the data storage layer 5a tilts with respect to the optical axis of the light beam emitted from the light source 1 in the radial direction of the optical disk 5. The phase compensator 216 compensates for the phase of the tilt error signal and then outputs it as a tilt control signal to the drive signal generator 218. On receiving the tilt control signal, the drive signal generator 218 outputs a tilt drive signal to the objective lens driver 206 to drive the objective lens 4 in the tilt direction as pointed by the arrow 233. As a result, the optical axis of the light focused on the data storage layer 5a is controlled so as to be perpendicular to the data storage layer 5a.

It is to be noted that the objective lens driver 206 works as a focus compensator, a tracking compensator and a tilt compensator in this embodiment. However, the objective lens driver 206 may works as only a focus compensator and a tracking compensator, and a tilt compensator may be provided separately. For example, it is possible to provide between the objective lens 4 and beam splitter 3 a liquid crystal device which compensates an aberration of an optical wave face by changing a refractive index in accordance with the tilt control signal.

The focus error signal generator 211, tracking error signal generator 212, phase compensators 214, 215 and 216, and drive signal generator 218 may have known configurations for use in a conventional optical disk drive. The focus error signal may be generated by any known technique such as an astigmatism method. The tracking error signal may also be generated by a known technique such as a phase difference method, a push-pull method or a three-beam method. The photodetector 30 may include either a single photosensor for use in common to generate the focus error, tracking error and tilt error signals or three separate photosensors for the three error signals. The photodetector 30 is usually provided for the optical head 203.

The control system 204 further includes a drive signal generator 224 to drive the traverse driver 207 and another drive signal generator 225 to drive the disk motor 202. The drive signal generator 224 is instructed by the controller 208 so as to move the beam spot to a predetermined track location on the data storage layer 5a according to the operating state of the optical disk drive 201 or to make the beam spot follow the tracks continuously as the read or write operation advances. In accordance with the instruction given by the controller 208, the drive signal generator 224 generates a drive signal to drive the traverse driver 207, thereby moving the optical head 203. On receiving an instruction from the controller 208, the drive signal generator 225 generates a drive signal to drive the disk motor 202 so as to spin the optical disk 5 at a predetermined rotational velocity.

The read signal processing system 205 preferably includes a waveform equalizer 220, a PLL 221 and a decoder 222 and generates a read signal by reading information from the data storage layer 5a of the optical disk 5. The waveform equalizer 220 receives a signal, including the information stored on the data storage layer 5a, from the photodetector 30 and amplifies that signal in a predetermined frequency range, thereby outputting an RF signal. Based on the RF signal received, the PLL 221 generates a clock signal synchronized with the RF signal. The decoder 222 decodes the RF signal responsive to the clock signal, thereby outputting the information stored on the data storage layer 5a.

Figure 3:
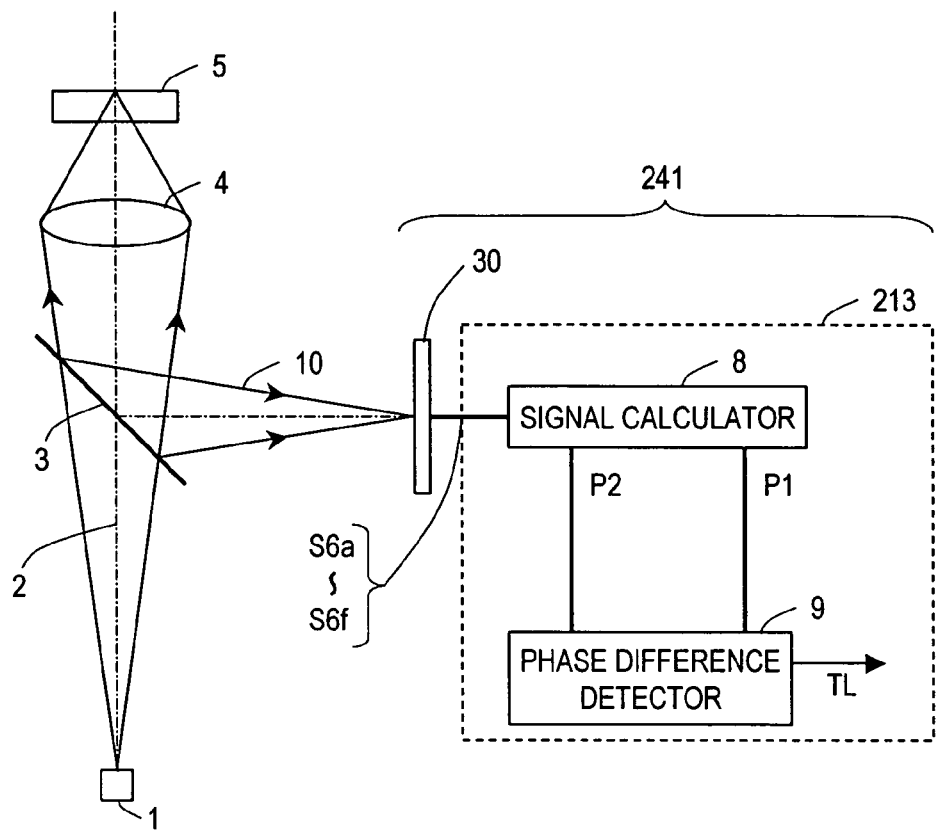
FIG. 3 is a block diagram showing a configuration for the tilt sensor of the optical disk drive shown in FIG. 2.

Next, the tilt sensor 241 will be described in detail. As shown in FIG. 3, the tilt sensor 241 preferably includes the photodetector 30 and the tilt detector 213. The tilt detector 213 preferably includes a signal calculator 8 and a phase difference detector 9. The light emitted from the light source 1 along the optical axis 2 is converged by the objective lens 4 so as to be focused on the data storage layer 5a. Thereafter, the focused light is reflected from the data storage layer 5a and then enters the objective lens 4 again. On the data storage layer 5a, multiple tracks are arranged either spirally or concentrically at a predetermined pitch. Accordingly, the light reflected from the data storage layer 5a includes light rays of multiple orders, which have been diffracted by the tracks that are arranged periodically. After passing through the objective lens 4, the light beam 10 is reflected from the beam splitter 3 toward the photodetector 30.

Figure 4:
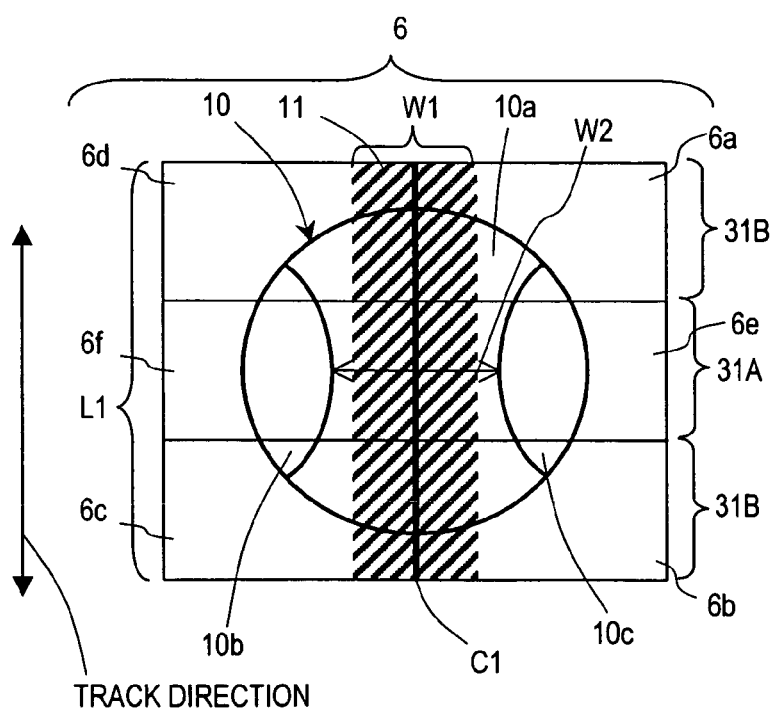
FIG. 4 is a plan view showing the photosensitive plane of the photodetector included in the tilt sensor shown in FIG. 3.
Figure 5A:
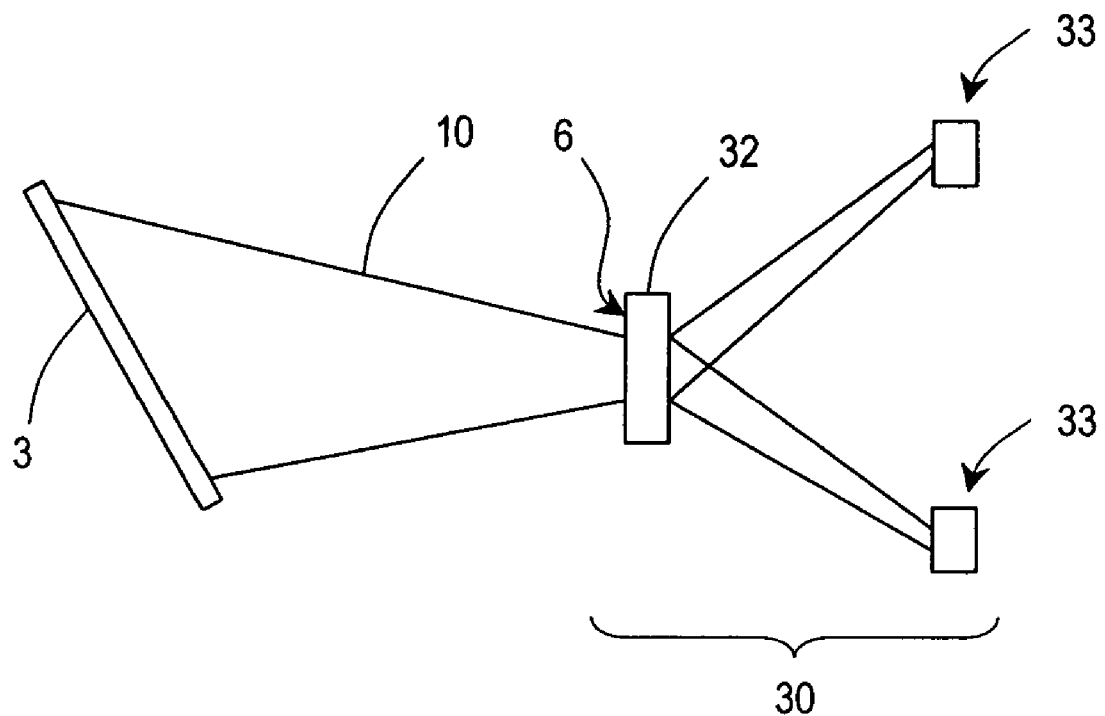
FIGS. 5A and 5B are schematic representations illustrating specific exemplary arrangements for the photodetector of the tilt sensor shown in FIG. 3.
Figure 5B:
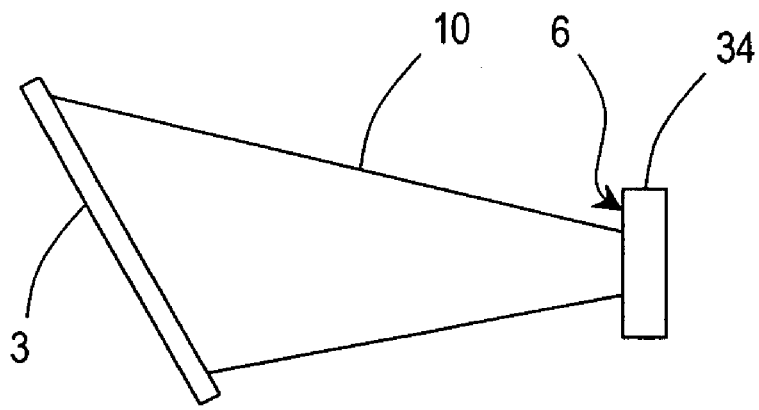

The photodetector 30 receives the light beam 10, detects its intensities in a plurality of areas separately and outputs multiple detection signals representing the intensities of the light that have been detected in the respective areas. FIG. 4 schematically illustrates the photosensitive plane 6 of the photodetector 30 for receiving the light beam 10 and detecting its intensities in a plurality of areas separately. As shown in FIG. 5A, the photodetector 30 may include a hologram 32 and multiple photosensors 33 and may have a configuration in which the hologram 32 splits the light beam 10 into multiple sub-beams to be guided to the respective photosensors 33. In that case, the surface of the hologram 32 on which the light beam 10 is incident is the photosensitive plane 6. Alternatively, in a preferred embodiment shown in FIG. 5B in which the photodetector 30 includes a photosensor 34 for receiving the light beam 10 directly and converting it into an electrical signal, the photosensitive plane 6 is the sensor plane of the photosensor 34.

As shown in FIG. 4, the beam spot of the light beam 10 preferably includes a zero-order light area 10a, a +first-order light area 10b and a −first-order light area 10c. In the +first-order light area 10b, the zero- and +first-order light rays diffracted by the track are superposed one upon the other. In the same way, in the −first-order light area 10c, the zero- and −first-order light rays diffracted by the track are superposed one upon the other. The zero-order light area 10a is sandwiched between the +first-order and −first-order light areas 10b and 10c, and includes only zero-order light with no +first-order or −first-order light.

The photosensitive plane 6 preferably includes a first-division area 31A that detects parts of the light beam 10 corresponding to the respective center portions of the +first-order and −first-order light areas 10b and 10c and a pair of second-division areas 31B that sandwiches the first-division area 31A between them. Each of the first- and second-division areas 31A and 31B is further split into two to detect parts of the light beam 10 corresponding to the +first-order and −first-order light areas 10b and 10c separately. More specifically, the first-division area 31A is split into areas 6e and 6f by a division line C1 defined between the +first-order and −first-order light areas 10b and 10c of the light beam 10. In the same way, the second-division areas 31B are also split by the division line C1 into two pairs of areas 6a, 6d and 6c, 6d. As shown in FIG. 4, the division line C1 is substantially parallel to the direction in which the tracks extend (i.e., the direction in which the beam spot of the light beam 10 follows the tracks). On the other hand, the boundaries between the first-division area 31A and the second-division areas 31B are substantially perpendicular to the direction in which the beam spot of the light beam 10 follows the tracks.

Figure 6A:
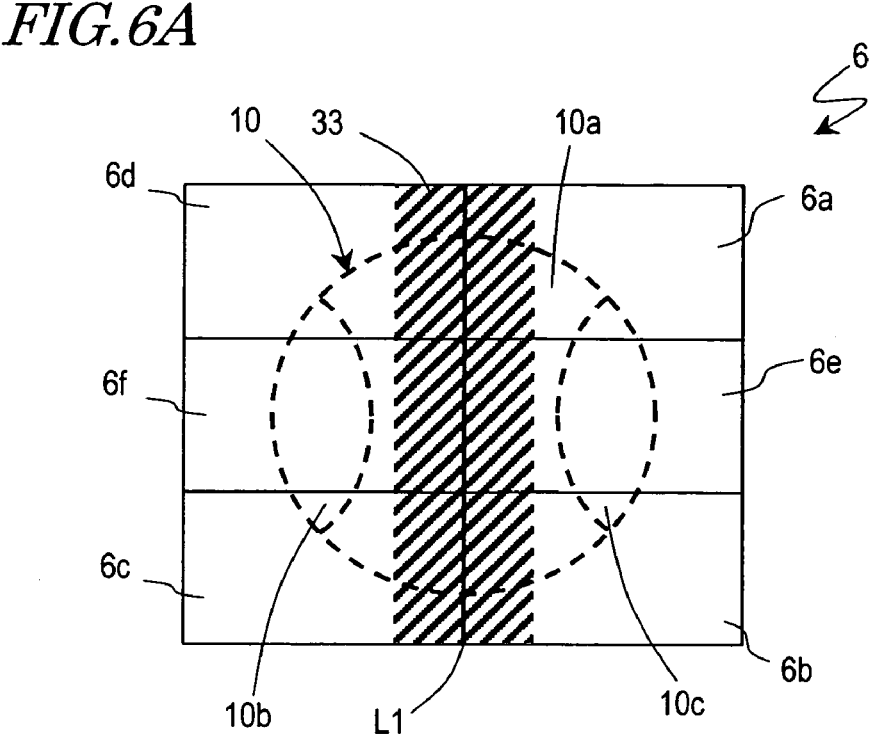
FIGS. 6A and 6B are plan views showing specific exemplary configurations of the photosensitive plane of the tilt sensor shown in FIG. 3.

In the tilt sensor 241 of this preferred embodiment, the photodetector 30 detects the light beam 10 in the respective photosensitive areas 6a through 6f with a part of the light beam 10 corresponding to at least a portion of the zero-order light area 10a excluded and outputs a plurality of detection signals representing the intensities of the light beam detected in the respective areas 6a through 6f. For that purpose, the photosensitive plane 6 includes an opaque area 11 to cut off a part of the light beam 10 corresponding to the zero-order light area 10a thereof. Thus, the part of the light beam that has entered the opaque area 11 does not contribute to generating any detection signal. For example, as shown in FIG. 6A, an opaque film 33 to prevent the light beam 10 from being transmitted may be provided in the opaque area 11 of the photosensitive plane 6. More specifically, the opaque film 33 may be provided for the photosensitive plane 6 of the hologram 32 shown in FIG. 5A or that of the photosensor 34 shown in FIG. 5B.

Figure 6B:
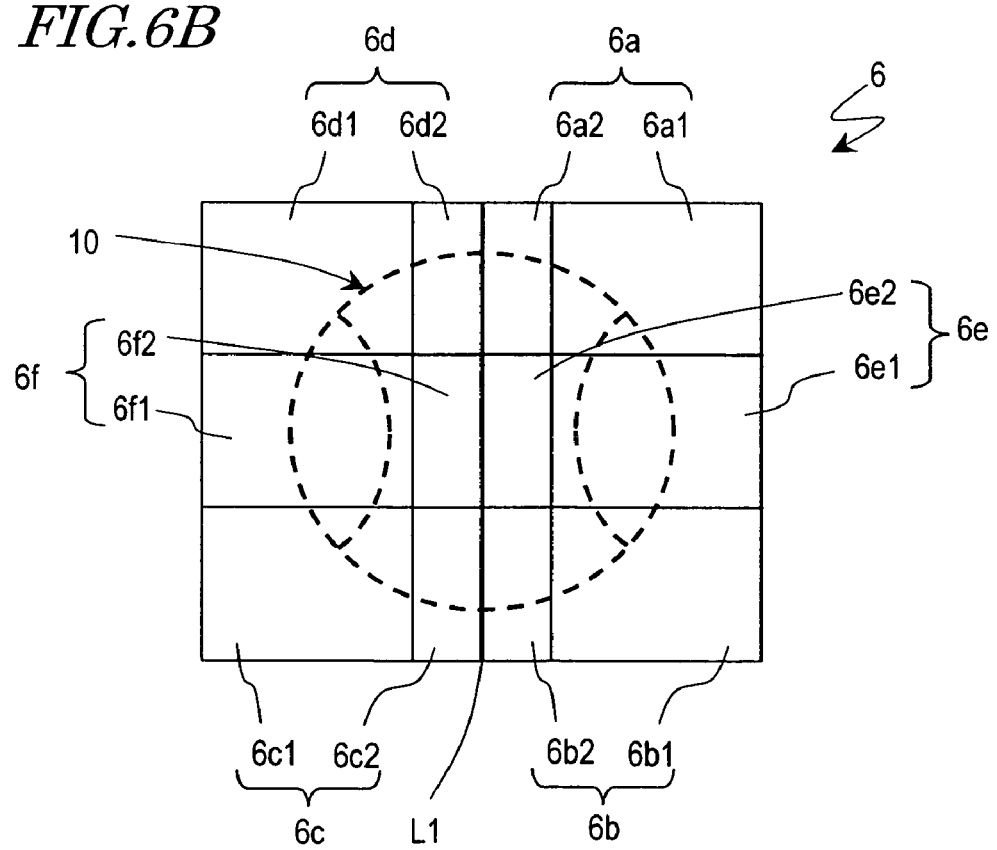

Alternatively, as shown in FIG. 6B, each of the photosensitive areas 6a through 6f of the photosensitive plane 6 may be subdivided into areas $6a_2$ through $6f_2$ overlapping with the opaque area 11 and areas $6a_1$ through $6f_1$ not overlapping with the opaque area 11 such that the light entering the areas $6a_2$ through $6f_2$ is not used. For example, the photosensitive plane 6 of the hologram 32 shown in FIG. 5A may be subdivided as shown in FIG. 6B such that the light entering the areas $6a_2$ through $6f_2$ does not reach the photosensor 33 but is guided to somewhere else. Alternatively, the photosensitive plane 6 of the photosensor 34 shown in FIG. 5B may also be subdivided as shown in FIG. 6B such that the detection signals generated by the light that has entered the areas $6a_2$ through $6f_2$ are not output to the tilt detector 213.

As shown in FIGS. 1A and 1B, the intensity distribution of the light in the zero-order light area 10a is asymmetric in the positive and negative domains when the center of the light beam 10 is regarded as the origin. Thus, to reduce the unwanted effects caused by this asymmetric intensity distribution of the light, the opaque area 11 is preferably provided symmetrically with respect to the division line C1. The length L1 of the opaque area 11 as measured in the track direction is preferably relatively large because the signal component representing the part of the light beam corresponding to the zero-order light area 10a can be reduced and because the signal intensity will not change with the focusing state so easily.

The width W1 of the opaque area 11 as measured perpendicularly to the track direction is preferably narrower than the width W2 of the gap between the +first-order light area 10b and −first-order light area 10c, shown in FIG. 4. This is because if the opaque area 11 overlapped with either the +first-order light area 10b or the −first-order light area 10c, then the amplitude of the push-pull signal to be described later, and eventually the detection sensitivity of the tilt error signal, would decrease unintentionally. Also, if the optical axis of the objective lens 4 has deviated from that of the light beam emitted from the light source 1, then the beam spot location of the light beam 10 will shift and the opaque area 11 may overlap with either the +first-order light area 10b or −first-order light area 10c. In that case, the detection sensitivity of the tilt error signal will decrease, too. For that reason, if the deviation of the objective lens 4 needs to be expected, then the width W1 of the opaque area 11 preferably has a good margin with respect to the width W2 of the gap between the +first-order light area 10b and −first-order light area 10c such that the opaque area 11 would never overlap with the +first-order light area 10b or the −first-order light area 10c even if the objective lens 4 deviated. In view of these considerations, supposing the beam spot diameter of the light beam 10 is one under Condition 1, the opaque area 11 preferably satisfies the inequalities 0.5<L1<1 and 0.3<W1<0.45.

As shown in FIG. 3, the detection signals S6a through S6f obtained from the respective photosensitive areas 6a through 6f of the photosensitive plane 6 are output to the signal calculator 8 of the tilt detector 213. The signal calculator 8 generates push-pull signals for the first- and second-division areas 31A and 31B based on the detection signals S6a through S6f. More specifically, the push-pull signals P1 and P2 for the first- and second-division areas 31A and 31B are given by:

$$P1=S6e-S6f \text{ and}$$

$$P2=S6a+S6b-(S6c+S6d)$$

respectively.

Figure 7A:
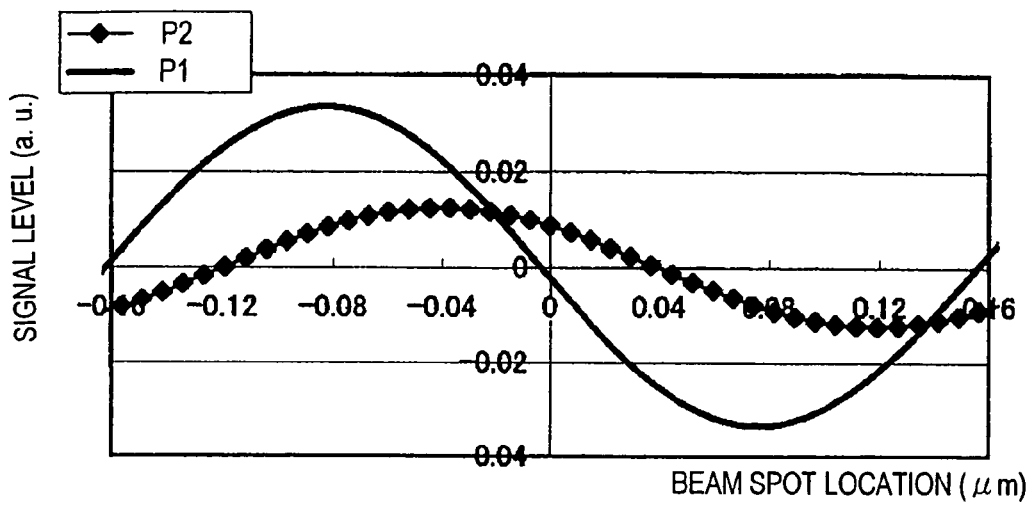
FIGS. 7A, 7B and 7C are graphs showing the waveforms of push-pull signals S1 and S2 obtained by the tilt sensor shown in FIG. 3 from optical disks with different tilt angles.
Figure 7B:
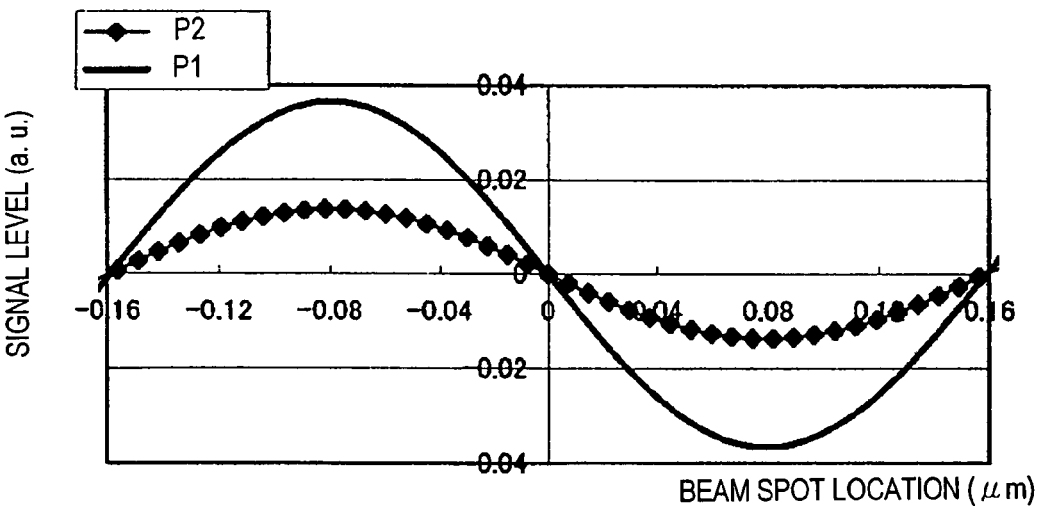
Figure 7C:
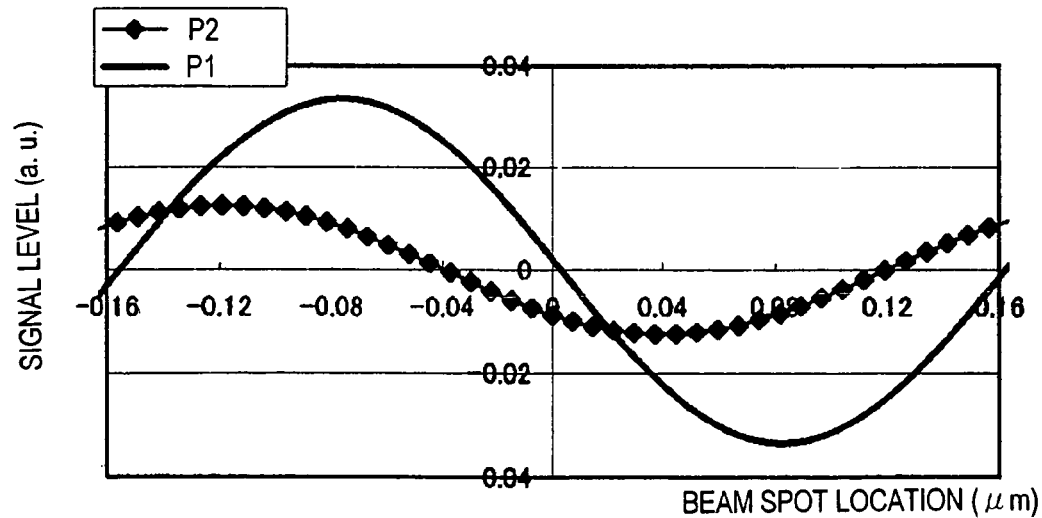

FIGS. 7A, 7B and 7C are graphs showing one period of the waveforms of the push-pull signals P1 and P2 that were modulated by a track. These waveforms were calculated under the same conditions as those specified for the background of this description. In FIGS. 7A, 7B and 7C, the optical disk has different radial tilt angles θ of −0.6, 0 and +0.6 degrees, respectively. That is to say, the optical disk tilted in mutually opposite directions in FIGS. 7A and 7C. As can be seen from FIGS. 7A through 7C, the phase of the signal P2 changes according to the tilt angle θ of the optical disk. In addition, the phase shifting direction also inverts according to the tilt direction of the optical disk. Meanwhile, the phase of the signal P1 does not change at all even if the tilt angle of the optical disk changes.

Accordingly, by detecting the magnitude and direction of this phase difference, the tilt angle of the optical disk can be detected. The phase difference may be detected by any known method. For example, the phase difference detector 9 shown in FIG. 3 receives the signals P1 and P2 from the signal calculator 8 and passes them through a low pass filter, thereby removing DC components from the signals. Thereafter, when the signal P1 changes from positive into negative, or vice versa (i.e., at the zero-crossing point thereof), the phase difference detector 9 detects the level of the signal P2, thereby outputting it as the tilt error signal TL.

Alternatively, the phase difference detector 9 may also generate a tilt error signal TL so as to correct the offset to be produced when the optical axis of the objective lens 4 shifted from that of the optical system including the light source 1. More specifically, by setting a predetermined constant k, the phase difference detector 9 may calculate $$TL=P1-k*P2$$

The tilt sensor 241 can detect the tilt angle of the optical disk by detecting the level of the tilt error signal TL while the beam spot of the light beam focused by the objective lens 4 is following the track.

Figure 8:
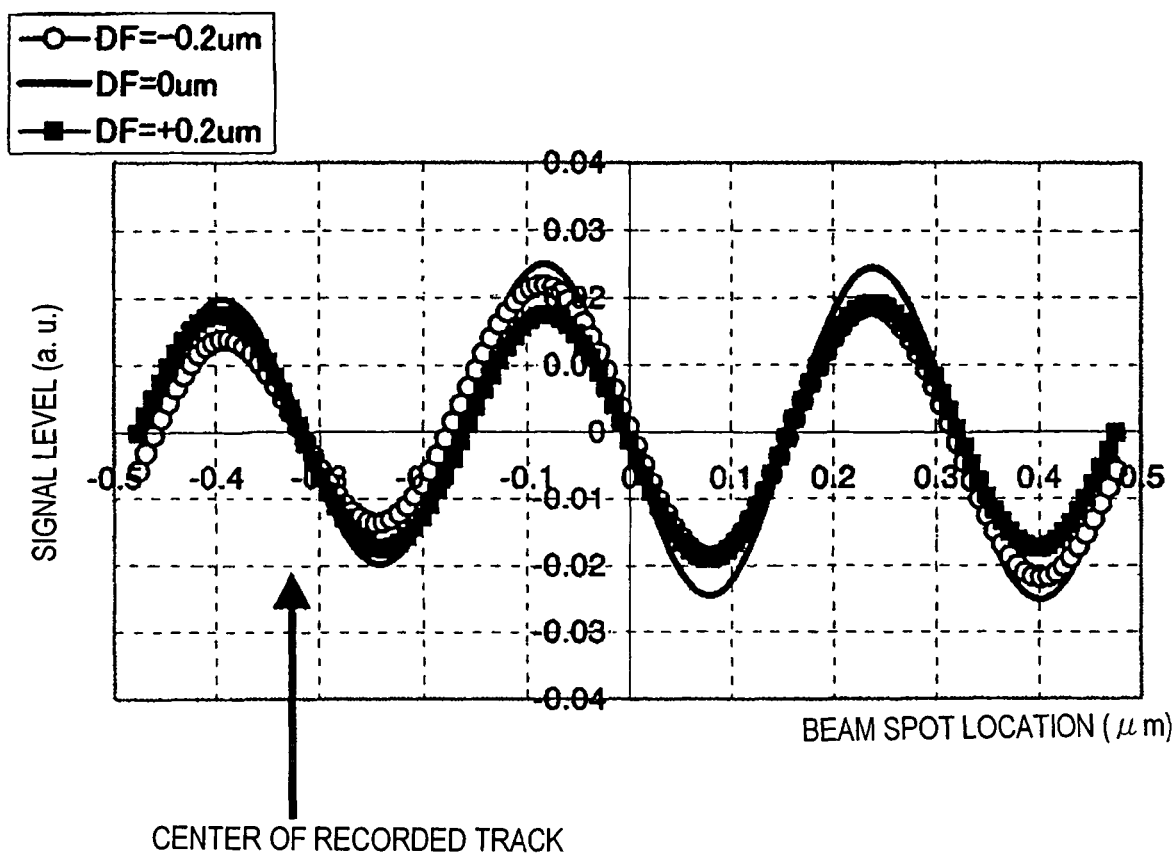
FIG. 8 is a graph showing the waveforms of tilt error signals obtained by the tilt sensor shown in FIG. 3 from optical disks with different tilt angles.

FIG. 8 is a graph showing the waveforms of the tilt error signal TL generated by the tilt sensor 241 with the degree of defocusing changed. To compare this tilt error signal TL with the conventional one easily, the tilt error signal TL was calculated by TL=P1−k*P2. This signal was also calculated under the same conditions as those specified for the background section of this description. In this example, the constant k was supposed to be 0.8 and the ratio of the width of the opaque area 11 as measured perpendicularly to the track direction to the beam spot diameter was supposed to be 0.35. FIG. 8 shows a curve representing a situation where the light beam was focused exactly on the target track (with no defocusing, or DF=0 μm) and a curve representing a situation where the light beam was out of focus by ±0.2 μm (i.e., DF=±0.2 μm). As is clear from the results shown in FIG. 8, when the beam spot was located at −0.32 μm, 0 μm and +0.32 μm, which were the respective centers of the three tracks, the signal level was almost equal to zero irrespective of the degree of defocusing. In other words, the zero-crossing points of these three graphs substantially match each other no matter how much the light beam was defocused. This means that the tilt error signal was not affected by the focusing state of the light beam being converged toward the optical disk.

As described above, according to this preferred embodiment, part of the light beam reflected from the optical disk, corresponding to at least a portion of the zero-order light area, is not used to generate the tilt error signal. Thus, the unwanted effects of the asymmetric light intensity distribution in the zero-order light area, resulting from the difference in reflectance between two adjacent tracks, can be minimized, thus generating a tilt error signal highly accurately, irrespective of the focusing state of the light beam being converged toward the optical disk. Accordingly, even if the optical disk is warped, for example, data can still be read and written at a high density from/on the optical disk.

Figure 9A:
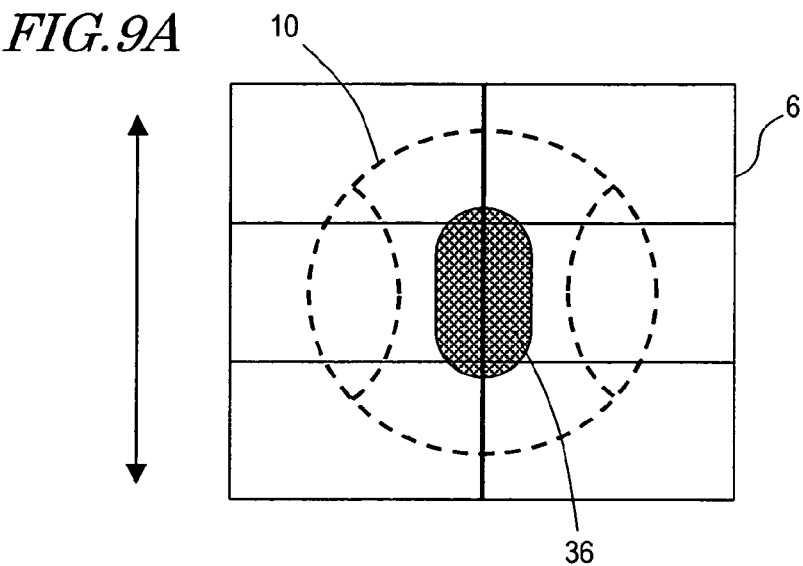
FIGS. 9A, 9B and 9C are plan views illustrating alternative opaque areas to be provided for the photosensitive plane.
Figure 9B:
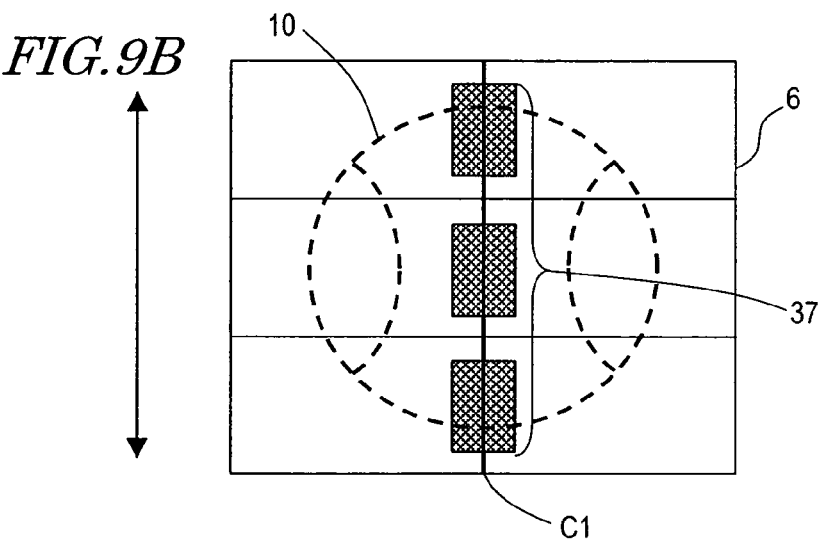
Figure 9C:
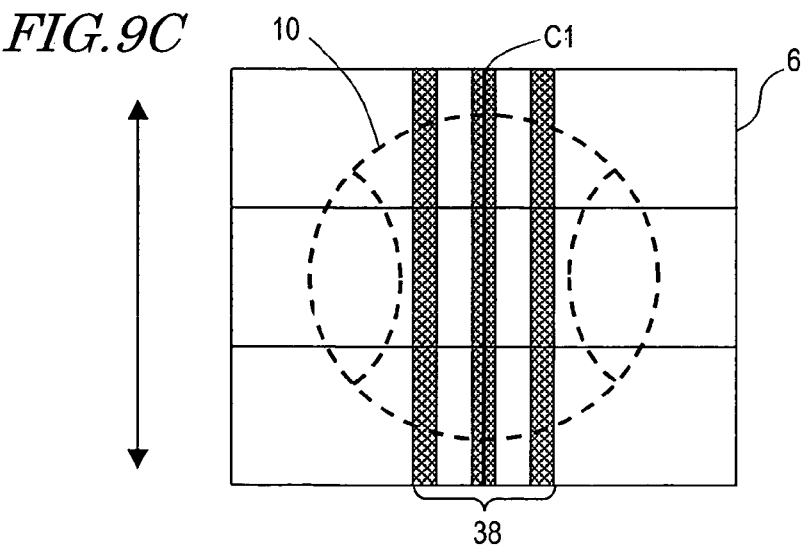

In the preferred embodiment described above, the opaque area of the photosensitive plane 6 has a rectangular strip shape. However, the opaque area may have any other shape. For example, as shown in FIG. 9A, an elliptical opaque area 36 may be provided for the photosensitive plane 6. Alternatively, the opaque area may also consist of a number of separate areas. For example, as shown in FIG. 9B, an opaque area 37 including a plurality of rectangular areas arranged in the track direction may be provided for the photosensitive plane 6. As another alternative, an opaque area 38 including a number of elongated areas arranged perpendicularly to the track direction may also be provided for the photosensitive plane 6.

Embodiment 2

Figure 10:
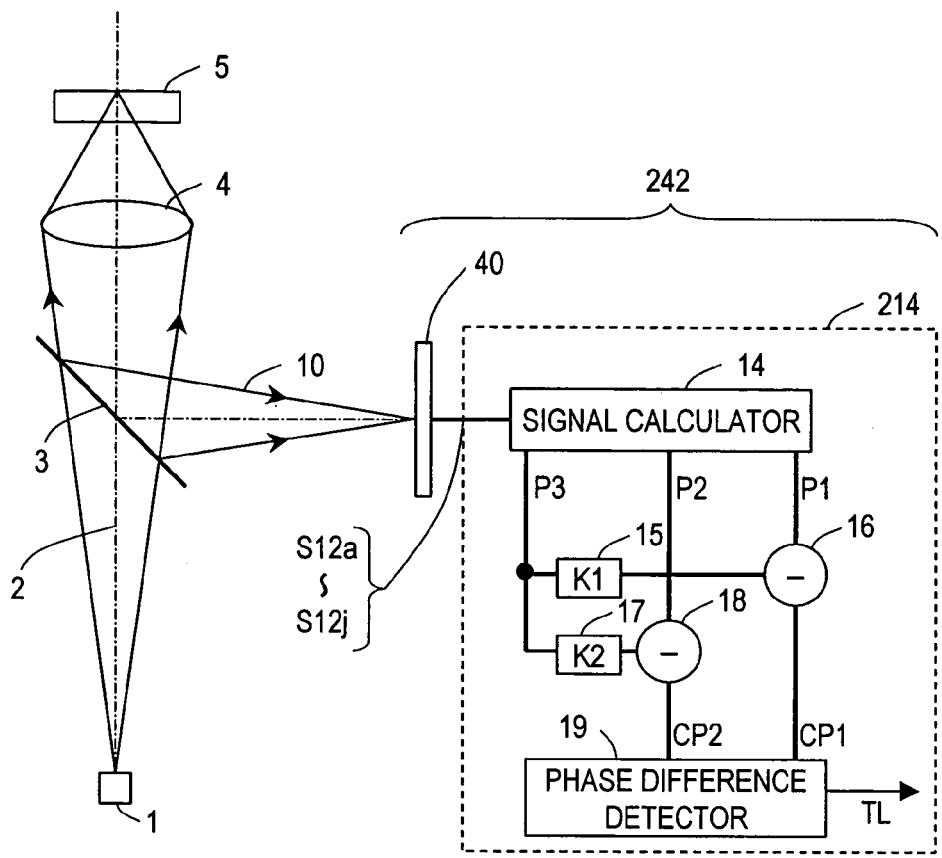
FIG. 10 is a block diagram showing a configuration for a tilt sensor for use in an optical disk drive according to a second specific preferred embodiment of the present invention.

FIG. 10 is a block diagram showing a configuration for a tilt sensor 242 for use in an optical disk drive according to a second specific preferred embodiment of the present invention. The optical disk drive of this second preferred embodiment has the same configuration as the optical disk drive shown in FIG. 2 except for the tilt sensor 242.

The tilt sensor 242 preferably includes a photodetector 40 and a tilt detector 214. The tilt detector 214 preferably includes a signal calculator 14, amplifiers 15, 17, differential amplifiers 16, 18 and a phase difference detector 19.

Figure 11:
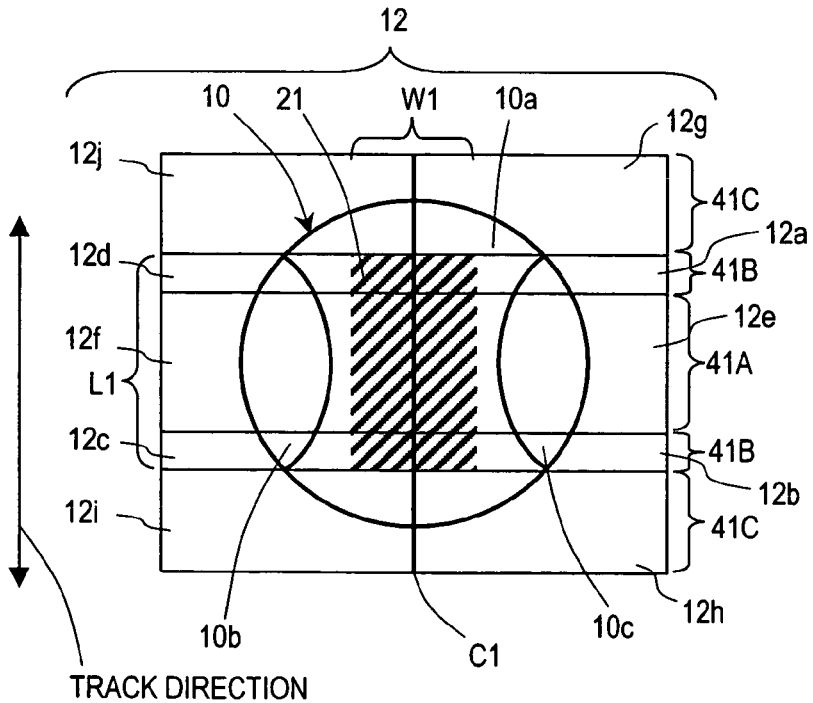
FIG. 11 is a plan view showing the photosensitive plane of the photodetector included in the tilt sensor shown in FIG. 10.

As in the first preferred embodiment described above, the photodetector 40 receives the light beam 10, detects its intensities in a plurality of photosensitive areas and outputs a plurality of detection signals representing the intensities of light beam detected in the respective photosensitive areas. FIG. 11 schematically illustrates the photosensitive plane 12 of the photodetector 40 for receiving the light beam 10 and detecting its intensities in a plurality of photosensitive areas. As already described for the first preferred embodiment, the photosensitive plane 12 may be either the surface of a hologram or that of a photosensor.

The photosensitive plane 12 preferably includes a first-division area 41A that detects parts of the light beam 10 corresponding to the respective center portions of the +first-order and −first-order light areas 10b and 10c, a pair of second-division areas 41B that sandwiches the first-division area 41A to detect other parts of the light beam 10 corresponding to other portions of the +first-order and −first-order light areas 10b and 10c, and a pair of third-division areas 41C that sandwiches the second-division areas 41B between them to detect parts of the light beam 10 corresponding to only portions of the zero-order light area 10a. Each of the first-, second- and third-division areas 41A, 41B and 41C is further split by the division line C1 between the +first-order light area 10b and −first-order light area 10c into two to detect parts of the light beam 10 separately. More specifically, the first-division area 41A is split into areas 12e and 12f. In the same way, the second-division areas 41B are also split into two pairs of areas 12a, 12d and 12b, 12c and the third-division areas 41C are also split into two pairs of areas 12g, 12j and 12h, 12i.

As in the first preferred embodiment described above, the photodetector 40 detects the light beam 10 in the respective photosensitive areas 12a through 12i with a part of the light beam 10 corresponding to at least a portion of the zero-order light area 10a excluded and outputs a plurality of detection signals representing the intensities of the light beam detected in the respective areas 12a through 12l. For that purpose, the photosensitive plane 12 includes an opaque area 21 to cut off a part of the light beam 10 corresponding to the zero-order light area 10a thereof. Thus, the part of the light beam that has entered the opaque area 21 does not contribute to generating any detection signal. The opaque area 21 may have the same specific structure as the counterpart 11 of the first preferred embodiment described above. The opaque area 21 is preferably provided only in the first- and second-division areas 41A and 41B of the photosensitive plane 12. Also, the opaque area 21 is preferably arranged symmetrically with respect to the division line C1. Supposing that under Condition 1 the length of the opaque area 21 in a track direction is L1, the first- and second-division areas 41A and 41B in a track direction is L3 and the beam spot diameter of the light beam 10 is one, the opaque area 21 preferably satisfies the inequalities 0.5<L1<L3 and 0.3<W1<0.45.

As shown in FIG. 10, the detection signals S12a through S12j obtained from the respective photosensitive areas 12a through 12j of the photosensitive plane 12 are output to the signal calculator 14 of the tilt detector 214. The signal calculator 14 generates push-pull signals for the first-, second- and third-division areas 41A, 41B and 41C based on the detection signals S12a through S12i. More specifically, the push-pull signals P1, P2 and P3 for the first-, second- and third-division areas 41A, 41B and 41C are given by:

$P1=S12e-S12f$, $P2=S12a+S12b-(S12c+S12d)$ and $P3=S12g+S12h-(S12i+S12j)$, respectively.

The signals P1 and P2 are based on the intensities of those parts of the light beam corresponding to portions of the +first-order light area 10b and −first-order light area 10c, and therefore, have been modulated by tracks. On the other hand, the signal P3 is based on the intensities of the other parts of the light beam corresponding to portions of the zero-order light area 10a, and therefore, has not been modulated by any track but includes information about the location of the beam spot on the photosensitive plane 12, which shifts with the deviation of the objective lens 4. The tilt detector 214 corrects the offsets to be produced in the signals P1 and P2 due to the deviation of the objective lens 4 using the signal P3, thereby generating a tilt error signal. More specifically, the signal P3 supplied from the signal calculator 14 is multiplied by K1 and K2 by the amplifiers 15 and 17, respectively, as shown in FIG. 10. The differential amplifier 16 subtracts the signal P3 multiplied by K1 from the signal P1, thereby generating a corrected signal CP1. The differential amplifier 18 subtracts the signal P3 multiplied by K2 from the signal P2, thereby generating a corrected signal CP2. In this case, the constants K1 and K2 are preferably determined so as to correct the offsets to be produced in the signals P1 and P2 due to the deviation of the objective lens. That is to say, the signals CP1 and CP2 are given by:

$CP1=P1-K1*P3$ $CP2=P2-K1*P3$

If the optical disk 5 has tilted, then a phase difference corresponding to the tilt of the optical disk will be produced between the waveforms of the signals CP1 and CP2 as in the signals P1 and P2 shown in FIG. 7. Accordingly, as in the first preferred embodiment described above, a tilt error signal TL representing the tilt of the optical disk is generated by having the phase difference detector 19 detect the phase difference.

Figure 12A:
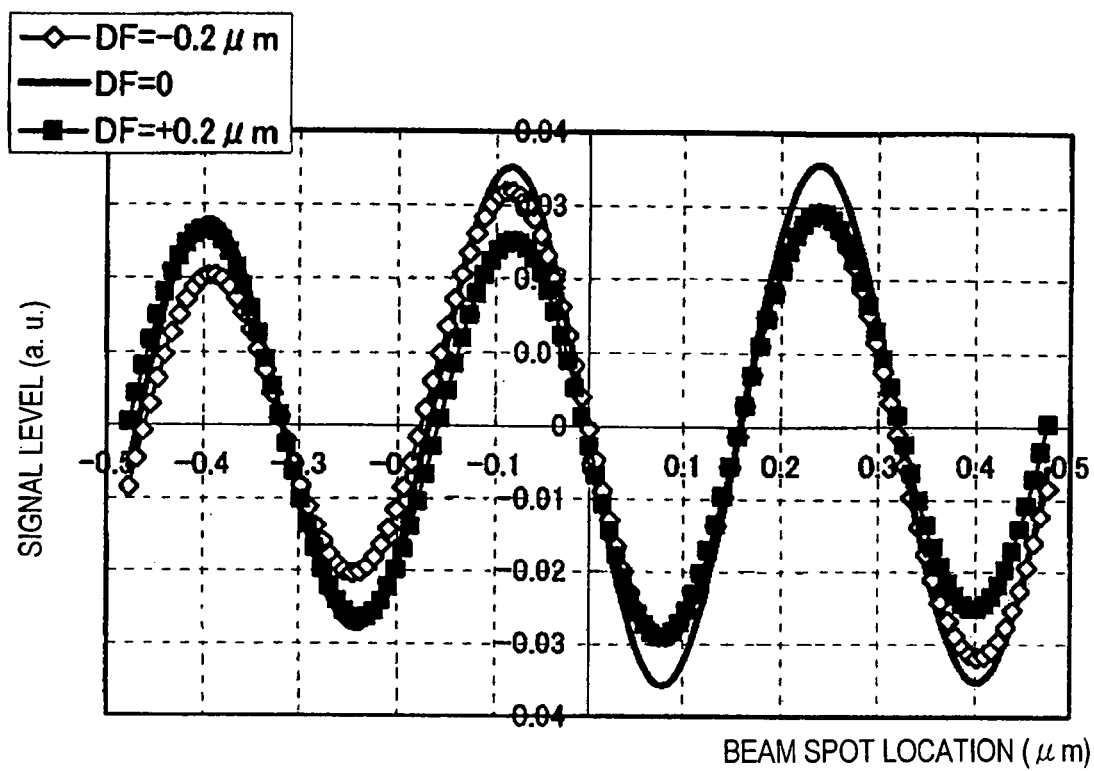
FIGS. 12A and 12B are graphs showing the waveforms of signals CP1 and CP2 obtained by the tilt sensor shown in FIG. 10 from optical disks with different tilt angles.
Figure 12B:
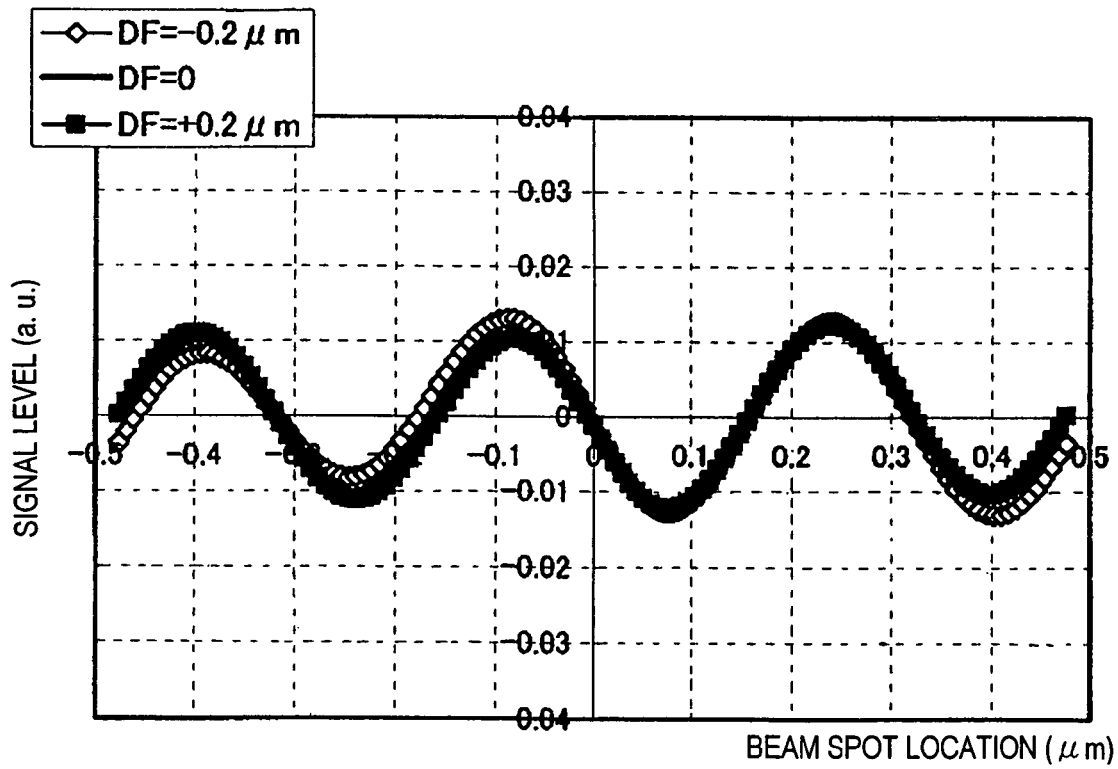
Figure 17B:
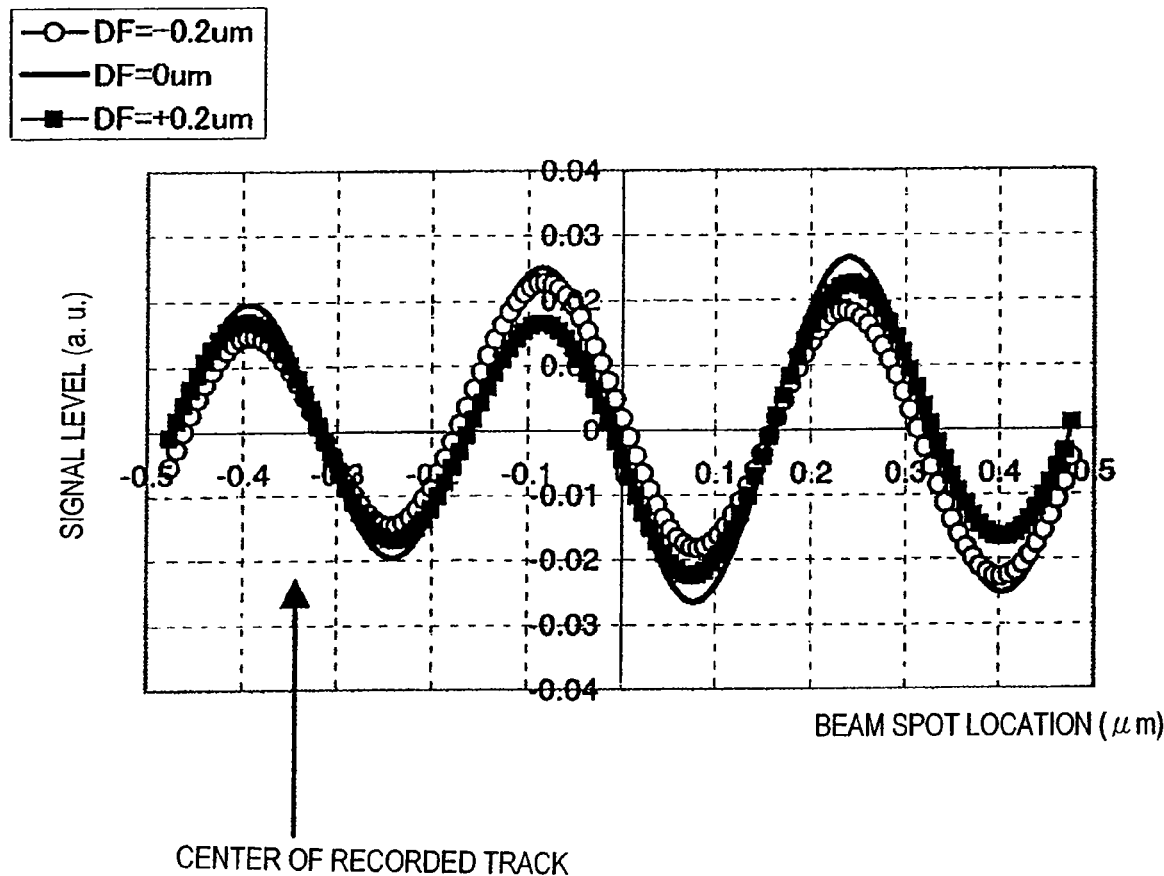
FIG. 17B is a graph showing tilt error signals obtained by the conventional optical disk drive from optical disks with different tilt angles.

FIGS. 12A and 12B are graphs showing the respective waveforms of the signals CP1 and CP2, which were modulated by three tracks shown in FIG. 17. These signals CP1 and CP2 were calculated under the conditions specified for the background section of this description with the beam spot locations defined at −0.2 µm, 0 µm and +0.2 µm, respectively. The ratios of the respective widths of the first- and second-division areas 41A and 41B as measured in the track direction to the beam spot diameter were supposed to be 0.35 and 0.65, and the constants K1 and K2 were supposed to be 1.4 and 1.0, respectively. The ratio of the width of the opaque area 21 as measured perpendicularly to the tracks to the beam spot diameter was supposed to be 0.35.

As shown in FIGS. 12A and 12B, in each of the signals CP1 and CP2, the zero-crossing points of the three graphs substantially matched each other irrespective of the focusing state. This means that the signal CP1 or CP2 was not easily affected by the degree of defocusing of the light beam due to the presence of the opaque area 21. The tilt error signal is generated based on the signals CP1 and CP2. Thus, this second preferred embodiment of the present invention also realizes an optical disk drive including a tilt sensor for generating a tilt error signal with the effects of defocusing minimized.

In addition, as can be seen from the waveforms shown in FIGS. 7A, 7B and 7C, even if the optical disk was tilted, the zero-crossing point of the waveform of the signal P1 hardly deviated from the center of the track. Accordingly, the signal CP1 generated based on such a signal P1 can be regarded as a constant signal of which the zero-crossing point hardly shifts even if the objective lens has deviated or if the optical disk has tilted. Consequently, the phase difference detector 19 can also detect the phase difference between the signals CP1 and CP2 and generate the tilt error signal even by detecting the level of the signal CP2 at the zero-crossing point of the signal CP1.

Furthermore, the signal CP1 is so constant as to be effective as a tracking control signal. For example, even by performing a tracking control using the signal CP1 and by making the phase difference detector 19 detect the level of the signal CP2 while the beam spot is following the track, the tilt error signal can also be generated, or the tilt of the optical disk can be detected, too.

It is to be noted that in Embodiments 1 and 2, the tilt error signal is generated by using the whole beam spot of the light beam irradiating on the photosensitive plane. However, the zero-order, −first-order and +first-order light areas of the light beam is symmetric with respect to the track direction. Therefore, it is possible to divide the beam spot of the light beam by a center line which passes the center of the beam spot in a direction perpendicular to the track direction so as to form a upper half area and a lower half area (referred based on the center line as a horizontal line) and to produce the tilt error signal by using either the upper half area or the lower half area. In this case, the other half area which is not used to produce the tilt error signal may be available for generating a focus error signal.

Figure 13:
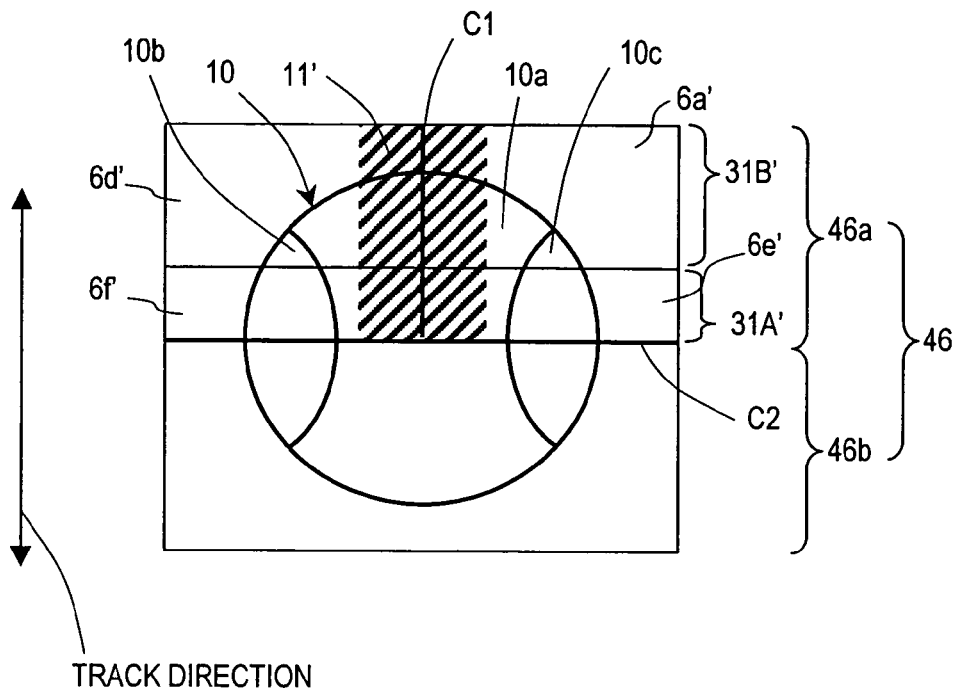
FIG. 13 is a modified example of the first specific preferred embodiment in which the upper half area of the light beam is used to produce the tilt error signal.

FIG. 13 is a modified example of Embodiment 1 in which the upper half area of the light beam 10 is used to produce the tilt error signal. As shown in FIG. 13, photosensitive plane 46 is split by the division line C2 which crosses the +first-order and −first-order light area and divides the beam spot of the light beam 10 symmetrically into two to form a pair of sub-regions 46a and 46b. The sub-region 46a includes a first-division area 31A' which receive parts of the light beam corresponding to respective central portions of the +first-order and −first-order light areas and a remaining second-division area 31B' other than the first-division area 31A'. The first-division area 31A' and second-division area 31B' are further split into areas 6e' and 6f' and areas 6a' and 6d' by the division line C1 so that the first- and second-division areas detect the light beam in a plurality areas defined by the division line C1 between the +first-order and −first-order light areas in the beam spot of the light beam. The opaque area 11' may have the same specific structure as the counterpart 11 of Embodiment 1 except that the opaque area 11' is provided in only the sub-region 46a.

FIG. 14 is a modified example of Embodiment 2 in which the upper half area of the light beam 10 is used to produce the tilt error signal. As shown in FIG. 14, photosensitive plane 52 is split by the division line C2 which crosses the +first-order and −first-order light area and divides the beam spot of the light beam 10 symmetrically into two to form a pair of sub-regions 52a and 52b. The sub-region 52a includes a first-division area 41A' which receives parts of the light beam corresponding to respective central portions of the +first-order and −first-order light areas, second-division area 41B' which is adjacent to the first-division area 41A' and receives parts of the light beam corresponding to remaining portions of the +first-order and −first-order light areas and a third-division area 41C' which is adjacent to the second-division area 41B' and receives the light beam corresponding to only the zero-order light area.

The first-division area 41A', the second-division area 41B' and the third-division area 41C' are further split into areas 12e' and 12f', areas 12a' and 12d', areas 12g' and 12j' by the division line C1. The opaque area 21' may have the same specific structure as the counterpart 21 of Embodiment 2 except that the opaque area 21' is provided in only the sub-region 52a.

The photosensitive plane having such structures, the sub-region 46b (FIG. 13) or the sub-region 52b (FIG. 14) which are not used for generating the tilt error signal may not be provided with the opaque area. Therefore, in the case where the sub-regions 46b and 52b are used for the focus error signal, it is possible to use the light beam reflected from the optical disk more effectively.

Various preferred embodiments of the present invention described above are effectively applicable for use in an optical disk drive that reads and/or writes data from/on a data storage medium on which recorded, unrecorded and erased tracks have mutually different reflectances (such as a phase change optical disk). Among other things, the present invention can be used particularly effectively in an optical disk drive with a mechanism for adjusting the tilt of an optical disk or an optical disk drive with the function of correcting a coma aberration, created due to the tilt of an optical disk, by tilting an objective lens.

This application is based on Japanese Patent Applications No. 2003-356074 filed on Oct. 16, 2003 and No. 2004-295748 filed on Oct. 8, 2004, the entire contents of which are hereby incorporated by reference.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A tilt sensor for detecting the tilt of a given optical disk by getting a light beam, emitted from a light source, converged by an objective lens toward a data storage layer of the optical disk and by sensing the intensities of the light beam, consisting of multiple light rays diffracted by at least one track on the data storage layer, the tilt sensor comprising:
 a photodetector having a photosensitive plane and detecting the light beam in a plurality of areas and outputting a plurality of detection signals representing the intensities of the light beam detected in the respective areas; and
 a tilt detector for generating a tilt error signal, including information about the tilt of the optical disk, based on the detection signals,
 wherein the light beam forms a beam spot on the photosensitive plane, the light beam including: (1) a +first-order light area, in which zero-order and +first-order light rays, diffracted by the track, are superposed one upon the other, (2) a −first-order light area, in which the zero-order light ray and a −first-order light ray are superposed one upon the other, and (3) a zero-order light area, which is sandwiched in a gap between the +first-order and the −first-order light areas, said zero-order light area including the zero-order light ray and not including the +first-order light ray and the −first-order light ray,
 wherein an opaque area is provided in a light path of the zero-order light area, and the photodetector generates the detection signals except for light rays that have entered the opaque area, wherein the opaque area is provided for neither the +first-order light area nor the −first-order light area,
 wherein the opaque area has a width W1, as measured perpendicularly to a direction into which the track extends, narrower than a width W2 of the gap between the +first-order light area and the −first-order light area, wherein the photosensitive plane includes a first-division area and a pair of second-division areas that sandwiches the first-division area between themselves, the first-division area being provided so as to receive parts of the light beam corresponding to respective central portions of the +first-order and −first-order light areas, each of the first-division and second-division areas being split into two areas to detect the light beam corresponding to the +first-order light area and the −first-order light area, respectively, and wherein the tilt detector generates two push-pull signals for the first and second-division areas of the photodetector and senses a phase difference between a waveform modulated by a track associated with one of the two push-pull signals and another waveform modulated by the same track associated with the other push-pull signal.

2. The tilt sensor of claim 1, wherein the photosensitive plane is split into a pair of sub-regions by a division line that crosses the +first-order and −first-order light areas so as to divide the beam spot of the light beam symmetrically into two, one of the pair of sub-regions including a first-division area which receive parts of the light beam corresponding to respective central portions of the +first-order and −first-order light areas and a remaining second-division area other than the first-division area, each of the first-division and second-division areas being split into two areas to detect the light beam corresponding to the +first-order light area and the −first-order light area, respectively.

3. The tilt sensor of claim 1, wherein the tilt detector senses the phase difference by detecting and comparing the levels of the two push-pull signals while the light beam focused by the objective lens is following the track.

4. The tilt sensor of claim 1, wherein the tilt detector multiplies one of the two push-pull signals by a predetermined coefficient, generates a differential signal representing a difference between the multiplied and non-multiplied push-pull signals, and detects the level of the differential signal while the light beam focused by the objective lens is following the track.

5. The tilt sensor of claim 1, wherein the photosensitive plane includes a first-division area, a pair of second-division areas that sandwiches the first-division area between themselves, and a pair of third-division areas that sandwiches the first- and second-division areas between themselves, the first-division area being provided so as to receive parts of the light beam corresponding to respective central portions of the +first-order and −first-order light areas, the second-division areas being provided so as to receive other parts of the light beam corresponding to other portions of the +first-order and −first-order light areas, the third-division areas being provided so as to receive only parts of the light beam corresponding to portions of the zero-order light area, and wherein each of the first-, second- and third-division areas is split into two areas by a division line between the +first-order and −first-order light areas in the beam spot of the light beam to detect the light beam in the two split areas.

6. The tilt sensor of claim 5, wherein the tilt detector generates three push-pull signals for the first-, second- and third-division areas of the photodetector and multiplies the push-pull signal associated with either the first-division area or third-division areas by a first predetermined value, and generates a first differential signal representing a difference between the multiplied and non-multiplied push-pull signals, wherein the tilt detector also multiplies the push-pull signal associated with either the second- or third-division areas by a second predetermined value, generates a second differential signal representing a difference between the multiplied and non-multiplied push-pull signals, and senses a phase difference between a waveform modulated by a track associated with the first differential signal and another waveform modulated by the same track associated with the second differential signal.

7. The tilt sensor of claim 5, wherein the tilt detector senses the phase difference by detecting and comparing the levels of the first and second differential signals while the light beam focused by the objective lens is following the track.

8. The tilt sensor of claim 5, wherein the opaque area cuts off only a part of the light beam that is going to enter the first- and second-division areas.

9. The tilt sensor of claim 5, wherein the photodetector includes a hologram, which has the photosensitive plane to be irradiated with the light beam and which is provided with the first-, second- and third-division areas, and a photosensor for detecting light rays that have come from the first-, second- and third-division areas of the hologram.

10. The tilt sensor of claim 9, wherein the hologram diffracts parts of the light beam in the opaque area so that the photosensor does not receive the parts of the light beam.

11. The tilt sensor of claim 1, wherein the photosensitive plane is split into a pair of sub-regions by a division line that crosses the +first-order and −first-order light areas so as to divide the beam spot of the light beam symmetrically into two, one of the pair of sub-regions including a first-division area which receives parts of the light beam corresponding to respective central portions of the +first-order and −first-order light areas, second-division area which is adjacent to the first-division area and receives parts of the light beam corresponding to remaining portions of the +first-order and −first-order light areas and a third-division area which is adjacent to the second-division area and receives the light beam corresponding to the zero-order light area, each of the first-, second- and third-division areas being split into two areas by a division line between the +first-order and −first-order light areas in the beam spot of the light beam to detect the light beam in the two split areas.

12. The tilt sensor of claim 1, wherein a recorded track and an unrecorded track of the optical disk have different reflectances.

13. The tilt sensor of claim 1, wherein the opaque area is provided symmetrically with respect to at least a centerline splitting the first-division area into two.

14. The tilt sensor of claim 1, wherein the photodetector includes a photosensor having the photosensitive plane to be irradiated with the light beam, the first- and second-division areas being defined on the photosensitive plane.

15. The tilt sensor of claim 14, wherein the photosensor includes an opaque film on the photosensitive plane so as not to detect the light beam in the opaque area.

16. The tilt sensor of claim 14, wherein the photosensor includes a detection area for detecting the light beam in an area corresponding to the opaque area, and wherein a signal obtained from the detection area is not used by the tilt detector to generate the tilt error signal.

17. The tilt sensor of claim 1, wherein the photodetector includes a hologram, which has the photosensitive plane to be irradiated with the light beam and which is provided with the first- and second-division areas, and a photosensor for detecting light rays that have come from the first- and second-division areas of the hologram.

18. The tilt sensor of claim 17, wherein the hologram diffracts parts of the light beam in the opaque area so that the photosensor does not receive the parts of the light beam.

19. The tilt sensor of claim 5, wherein the photodetector includes a photosensor having the photosensitive plane to be irradiated with the light beam, the first-, second- and third-division areas being defined on the photosensitive plane.

20. The tilt sensor of claim 19, wherein the photosensor includes an opaque film on the photosensitive plane so as not to detect the light beam in the opaque area.

21. The tilt sensor of claim 19, wherein the photosensor includes a detection area for detecting the light beam in an area corresponding to the opaque area, and
wherein a signal obtained from the detection area is not used by the tilt detector to generate the tilt error signal.

22. The tilt sensor of claim 1, wherein a ratio of the width W1 with respect to a diameter of the beam spot on the photosensitive plane is greater than 0.3 and less than 0.45.

23. An optical disk drive comprising:
a disk motor for rotating and driving an optical disk with a data storage layer;
an optical head, which includes a light source, an objective lens for focusing a light beam, emitted from the light source, onto the data storage layer of the optical disk, and a tilt compensator for compensating an aberration due to a tilt of the objective lens with respect to a direction perpendicular to the data storage layer and which reads and writes data from/on the data storage layer;
the tilt sensor of claim 1; and
a drive signal generator for driving the objective lens driver on receiving the tilt error signal from the tilt sensor.

24. An optical disk drive of claim 23, wherein the tilt compensator is an objective lens driver for tilting the objective lens at least in a radial direction of the optical disk.

* * * * *